(12) United States Patent
Lee

(10) Patent No.: US 12,720,180 B2
(45) **Date of Patent: *Aug. 25, 2026**

(54) FOLDED CAMERA FOR REDUCING STRAY LIGHT AND ELECTRONIC DEVICE INCLUDING THE SAME

(71) Applicant: SAMSUNG ELECTRONICS CO., LTD., Suwon-si (KR)

(72) Inventor: Yongjae Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 17 days.

This patent is subject to a terminal disclaimer.

(21) Appl. No.: 18/912,664

(22) Filed: Oct. 11, 2024

(65) Prior Publication Data

US 2025/0039528 A1 Jan. 30, 2025

Related U.S. Application Data

(63) Continuation of application No. 18/204,174, filed on May 31, 2023, now Pat. No. 12,177,552, which is a (Continued)

(30) Foreign Application Priority Data

May 27, 2022 (KR) ........................ 10-2022-0065052
Sep. 19, 2022 (KR) ........................ 10-2022-0117829
May 24, 2023 (KR) ........................ 10-2023-0067193

(51) Int. Cl.
*H04N 5/335* (2011.01)
*G02B 5/04* (2006.01)
(Continued)

(52) U.S. Cl.
CPC ............... *H04N 23/55* (2023.01); *G02B 5/04* (2013.01); *G02B 5/208* (2013.01); *H04N 23/61* (2023.01); *H04N 23/687* (2023.01)

(58) Field of Classification Search
CPC ........................................................ G02B 5/04
See application file for complete search history.

(56) References Cited

U.S. PATENT DOCUMENTS 10,215,968 B2 2/2019 Bae et al.
10,542,874 B2 1/2020 Fujimori
(Continued)

FOREIGN PATENT DOCUMENTS

JP 2004-104652 A 4/2004
JP 2014036413 A 2/2014
(Continued)

OTHER PUBLICATIONS

Communication dated Feb. 6, 2025 issued by the Russian Intellectual Property Office in counterpart Russian Application No. 2024129933.
(Continued)

*Primary Examiner* — Gary C Vieaux
(74) *Attorney, Agent, or Firm* — Sughrue Mion, PLLC

(57) ABSTRACT

Provided is a lens assembly comprising at least two lenses aligned along a first optical axis; an image sensor configured to receive light guided or condensed through the at least two lenses; and at least one optical member disposed between the at least two lenses and the image sensor to receive light incident through the at least two lenses, and refract or reflect the light at least twice, to guide or emit the light to the image sensor, where a ratio of a longer side of an imaging surface of the image sensor to a longer side of an emission surface of a first optical member closest to the image sensor is within a specified range.

19 Claims, 21 Drawing Sheets

Related U.S. Application Data continuation-in-part of application No. PCT/KR2023/001918, filed on Feb. 9, 2023.

(51) Int. Cl.

| | |
|---|---|
| ***G02B 5/20*** | (2006.01) |
| ***H04N 23/55*** | (2023.01) |
| ***H04N 23/61*** | (2023.01) |
| ***H04N 23/68*** | (2023.01) |

(56) References Cited

U.S. PATENT DOCUMENTS

| | | | | |
|---|---|---|---|---|
| 10,732,389 | B2 | 8/2020 | Chen | |
| 12,177,552 | B2 * | 12/2024 | Lee | G02B 5/04 |
| 2001/0008460 | A1 | 7/2001 | Yamawaki | |
| 2004/0032666 | A1 | 2/2004 | Baba | |
| 2004/0135919 | A1 | 7/2004 | Kim | |
| 2006/0017834 | A1 | 1/2006 | Konno et al. | |
| 2007/0024739 | A1 | 2/2007 | Konno | |
| 2012/0026384 | A1 | 2/2012 | Yamada | |
| 2015/0153545 | A1 | 6/2015 | Chen et al. | |
| 2015/0253647 | A1 | 9/2015 | Mercado | |
| 2016/0080617 | A1 | 3/2016 | Li et al. | |
| 2017/0276912 | A1 | 9/2017 | Yao et al. | |
| 2019/0243112 | A1 | 8/2019 | Yao et al. | |
| 2020/0150400 | A1 | 5/2020 | Tseng et al. | |
| 2020/0393677 | A1 | 12/2020 | Hua et al. | |
| 2021/0041765 | A1 | 2/2021 | Shigemitsu et al. | |
| 2021/0048649 | A1 | 2/2021 | Goldenberg et al. | |
| 2021/0063688 | A1 | 3/2021 | Shin et al. | |
| 2021/0063704 | A1 | 3/2021 | Son et al. | |
| 2021/0092263 | A1 | 3/2021 | Jung | |
| 2021/0096338 | A1 | 4/2021 | Saiga | |
| 2021/0199918 | A1 | 7/2021 | Lee | |
| 2021/0366968 | A1 | 11/2021 | Carrion et al. | |
| 2022/0091373 | A1 * | 3/2022 | Saiga | G02B 13/0035 |
| 2022/0091398 | A1 * | 3/2022 | Smyth | H04N 23/687 |
| 2023/0072601 | A1 | 3/2023 | Park et al. | |
| 2023/0156307 | A1 | 5/2023 | Rho | |

FOREIGN PATENT DOCUMENTS

| | | | |
|---|---|---|---|
| JP | 5482785 | B2 | 5/2014 |
| JP | 2021-036258 | A | 3/2021 |
| KR | 10-2007-0019819 | A | 2/2007 |
| KR | 10-2020-0131836 | A | 11/2020 |
| KR | 10-2020-0143920 | A | 12/2020 |
| KR | 10-2021-0035380 | A | 4/2021 |
| KR | 10-2021-0100429 | A | 8/2021 |

OTHER PUBLICATIONS

Search Report dated Dec. 13, 2024 issued by the Russian Intellectual Property Office in counterpart Russian Application No. 2024129933.

Korean Office Action dated Feb. 21, 2024 in Korean Application No. 10-2023-0067193.

International Search Report dated May 9, 2023 issued by the International Searching Authority in counterpart International Application No. PCT/KR2023/001918 (PCT/ISA/210).

International Written Opinion May 9, 2023 dated issued by the International Searching Authority in counterpart International Application No. PCT/KR2023/001918 (PCT/ISA/237).

Communication dated May 27, 2025 issued by the European Patent Office in European Patent Application No. 23811937.4.

Communication issued Jan. 27, 2026 by the European Patent Office in European Patent Application No. 25212177.7.

Communication dated May 13, 2026, issued by the European Patent Office in European Application No. 23811937.4.

* cited by examiner

FOLDED CAMERA FOR REDUCING STRAY LIGHT AND ELECTRONIC DEVICE INCLUDING THE SAME

CROSS-REFERENCE TO RELATED APPLICATIONS

This application is a continuation application of U.S. patent application Ser. No. 18/204,174, filed May 31, 2023, which is a bypass continuation-in-part application of PCT International Application No. PCT/KR2023/001918, which was filed on Feb. 9, 2023, and claims priority to Korean Patent Application No. 10-2022-0065052, filed on May 27, 2022, Korean Patent Application No. 10-2022-0117829, filed on Sep. 19, 2022, and Korean Patent Application No. 10-2023-0067193, filed on May 24, 2023 in the Korean Intellectual Property Office, the disclosures of all of which are incorporated herein by reference in their entireties.

BACKGROUND

1. Field

The disclosure relates to an electronic device, and more specifically, an image capturing device and an electronic device comprising the same.

2. Description of Related Art

Electronic devices may refer to devices that perform specific functions based on embedded programs, such as home appliances, electronic notes, portable multimedia players (PMPs), mobile communication terminals, tablet personal computers (PCs), video/audio devices, desktop/laptop computers, vehicle navigation systems, and so forth. For example, these electronic devices may output stored information in the form of sound or images. With the increasing integration of electronic devices and the common use of ultra-high-speed and large-volume wireless communication, various functions have recently come to be provided in a single electronic device, such as a mobile communication terminal. For example, various functions such as an entertainment function such as gaming, a multimedia function such as music/video playback, a communication and security function for mobile banking, and/or a function such as a schedule management or electronic wallet, as well as a communication function have been integrated into a single electronic device.

Development of digital camera manufacturing technologies has commercialized electronic devices equipped with small and lightweight camera modules. Electronic devices (for example, mobile communication terminals) commonly carried all the time are equipped with camera modules such that users can conveniently use various functions including not only still or moving image capture, but also video conferencing and augmented reality.

There has recently been widespread use of electronic devices including multiple cameras. The electronic device may comprise, for example, a camera module including a wide-angle camera and a telephoto camera. The electronic device may use the wide-angle camera to photograph a wide range of scenes on the periphery of the electronic device, thereby acquiring wide-angle images, or may use the telephoto camera to photograph scenes corresponding to locations relatively far from the electronic device, thereby acquiring telephoto images. As such, compact electronic devices (for example, smartphones) including multiple camera modules or image capturing devices have gradually replaced compact cameras, and are expected to replace high-performance cameras (for example, single-lens reflex cameras) in the future.

The above-described information may be provided as a background art for helping understand the disclosure. No claim or determination is raised regarding whether any of the above description is applicable as a prior art in connection with the disclosure.

SUMMARY

As electronic devices become more compact and lighter, it may be more convenient to carry the electronic devices. In an environment where a display is enlarged to enable a user to enjoy a larger screen even in a portable electronic device, the electronic devices may become more compact and lightweight by reducing thickness thereof. In this case, however, it may be hard to mount an image capturing device having good optical performance due to narrow space of a miniaturized electronic device. For example, as a number or a size of an image capturing device becomes larger, it may be easier to secure good optical performance of the image capturing device; however, due to this, a degree of freedom in design may be reduced in the arrangement of lens(s) or image sensors in a miniaturized electronic device.

Various embodiments of the disclosure is to address the above-described problems and/or drawbacks and provide advantages described below, providing an image capturing device having improved design freedom and/or an electronic device including the same.

For example, according to an embodiment of the disclosure, it is possible to provide an image capturing device that may be easily disposed in its narrow space and/or an electronic device including the same.

The technical object to be achieved in the present disclosure is not limited to the aforementioned problems, and other technical problems that are not mentioned may be clearly understood from the following disclosure by those of ordinary skill in the art.

According to an aspect of the disclosure, an image capturing device includes: at least two lenses aligned along a first optical axis; an image sensor configured to receive light guided or condensed through the at least two lenses; and at least one optical member disposed between the at least two lenses and the image sensor, the at least one optical member configured to receive light incident through the at least two lenses, and refract or reflect the light at least twice, to guide or emit the light to the image sensor, where the image capturing device is configured to satisfy 1.2=<w/img-X=<2.5 and 15=<Ang-min=<50, where 'img-X' represents a length of a longer side of an imaging surface of the image sensor, 'w' represents a length of a longer side of an emission surface of a first optical member from the at least one optical member that is closest to the image sensor, the emission surface facing the image sensor, and 'Ang-min' represents a smallest angle formed by two adjacent surfaces of the first optical member.

The first optical member may be configured to have a dispersion value Vd-1 that satisfies 25=<Vd-1=<95.

The first optical member comprises an anti-reflection coating layer formed on at least one of an incident surface facing the at least two lenses, and the emission surface.

The first optical member comprises an infrared blocking coating layer formed on at least one of an incident surface facing the at least two lenses, and the emission surface.

The image capturing device may be configured to have a Field of View (FOV) that satisfies 5=<FOV=<35.

The image capturing device may be configured to move at least one of the at least two lenses along the first optical axis, to perform a focusing function.

The image capturing device may be configured to move at least one of the at least two lenses along a direction perpendicular to the first optical axis, to perform an image stabilizing function.

The image capturing device may be configured to move or rotate the at least one optical member, to perform an image at least one of an stabilizing function and a subject tracking function.

The image capturing device may further comprise a second optical member aligned with the at least one optical member along the first optical axis with the at least two lenses interposed therebetween, the second optical member configured to receive light incident from a direction different from that of the first optical axis, and refract or reflect the light in the direction of the first optical axis, to guide the light to the at least two lenses.

The first optical member may further comprise an incident surface facing the at least two lenses, and the first optical member may be configured to reflect or refract the light incident on the incident surface at least twice between the incident surface and the emission surface.

The first optical member may further comprise a reflective surface disposed to be inclined with respect to the emission surface, where the emission surface and the reflective surface are configured to reflect or refract the light incident on the incident surface, inside the first optical member, and the light reflected or refracted at least twice inside the first optical member is guided or emitted to the image sensor through the emission surface.

The image capturing device may be configured such that at least one of an angle between the incident surface and the reflective surface or an angle between the reflective surface and the emission surface satisfies 15=<Ang-min=<50.

The first optical member may comprise a prism.

According to an aspect of the disclosure, an electronic device includes: an image capturing device; a memory storing instructions; and a processor configured to execute the instructions to acquire an image by receiving external light using the image capturing device. The image capturing device comprises: at least two lenses aligned along a first optical axis, an image sensor configured to receive light guided or condensed through the at least two lenses, and at least one optical member disposed between the at least two lenses and the image sensor, the at least one optical member configured to receive light incident through the at least two lenses, and refract or reflect the light at least twice, to guide or emit the light to the image sensor. The image capturing device is configured to satisfy 1.2=<w/img-X=<2.5 and 15=<Ang-min=<50, where 'img-X' represents a length of a longer side of an imaging surface of the image sensor, 'w' represents a length of a longer side of an emission surface of a first optical member from the at least one optical member that is closest to the image sensor, the emission surface facing the image sensor, and 'Ang-min' represents a smallest angle formed by two adjacent surfaces of the first optical member.

The processor may be further configured to execute the instructions to move at least one of the at least two lenses along the first optical axis, to perform a focusing function.

The processor may be further configured to execute the instructions to move at least one of the at least two lenses along a direction perpendicular to the first optical axis, to perform an image stabilizing function.

The processor may be further configured to execute the instructions to move or rotate the at least one optical member, to perform at least one of an image stabilizing function and a subject tracking function.

The first optical member may be configured to have a dispersion value Vd-1 that satisfies 25=<Vd-1=<95.

The image capturing device may be configured to have a Field of View (FOV) that satisfies 5=<FOV=<35.

The first optical member may further comprise an infrared blocking coating layer formed on at least one of an incident surface facing the at least two lenses, and the emission surface.

According to an aspect of the disclosure, an image capturing device may include at least two lenses aligned along an optical axis; an optical member disposed such that light passing through the at least two lenses is incident via a first surface of the optical member reflected at least twice within the optical member, and emitted out of the optical member via a second surface thereof; and an image sensor configured to detect the light emitted from the second surface of the optical member through an imaging surface. In an embodiment, the optical member and the image sensor may be disposed such that a first side of the second surface and a second side of the imaging surface are parallel to each other, while the second surface and the imaging surface are parallel to each other. In an embodiment, the second side of the imaging surface may be longer than adjacent other sides of the imaging surface, and a first length of the first side may be longer than a second length of the second side.

According to an aspect of the disclosure, an electronic device may include the image capturing device as described above, and a processor configured to obtain an image by receiving external light using the image capturing device.

BRIEF DESCRIPTION OF THE DRAWINGS

The above and other aspects, features, and advantages of the disclosure will be more apparent from the following detailed description taken in conjunction with the accompanying drawings, in which.

Throughout the accompanying drawings, similar reference numbers may be assigned to similar components, configurations, and/or structures.

DETAILED DESCRIPTION

The following description with reference to the accompanying drawings may be provided to assist in a comprehensive understanding for variously implementing the disclosure defined by the claims and their equivalents. The specific embodiments disclosed in the following descriptions comprise various specific details for helping understanding, but may be regarded as one of various embodiments. Accordingly, it is obvious to a person skilled in the art that various changes and modifications of the various implementations disclosed in the disclosure may be made without departing from the technical idea and scope of the disclosure. In addition, descriptions of well-known functions and configurations may be omitted for clarity and conciseness.

The terms and words used in the following description and claims are not limited to the bibliographical meanings, and may be used to clearly and consistently describe the various embodiments of the disclosure. Therefore, it will be obvious to those skilled in the art that the following descriptions for various implementations of the disclosure are provided only for the purpose of explanation, not for the purpose of limiting the disclosure defined as the scope of rights and equivalents thereto.

It should be understood that the singular forms "a", "an", and "the" includes plural meanings, unless the context clearly indicates otherwise. Therefore, for example, it may mean that the term "the surface of an element" includes one or more of the surfaces of the element.

Figure 1:
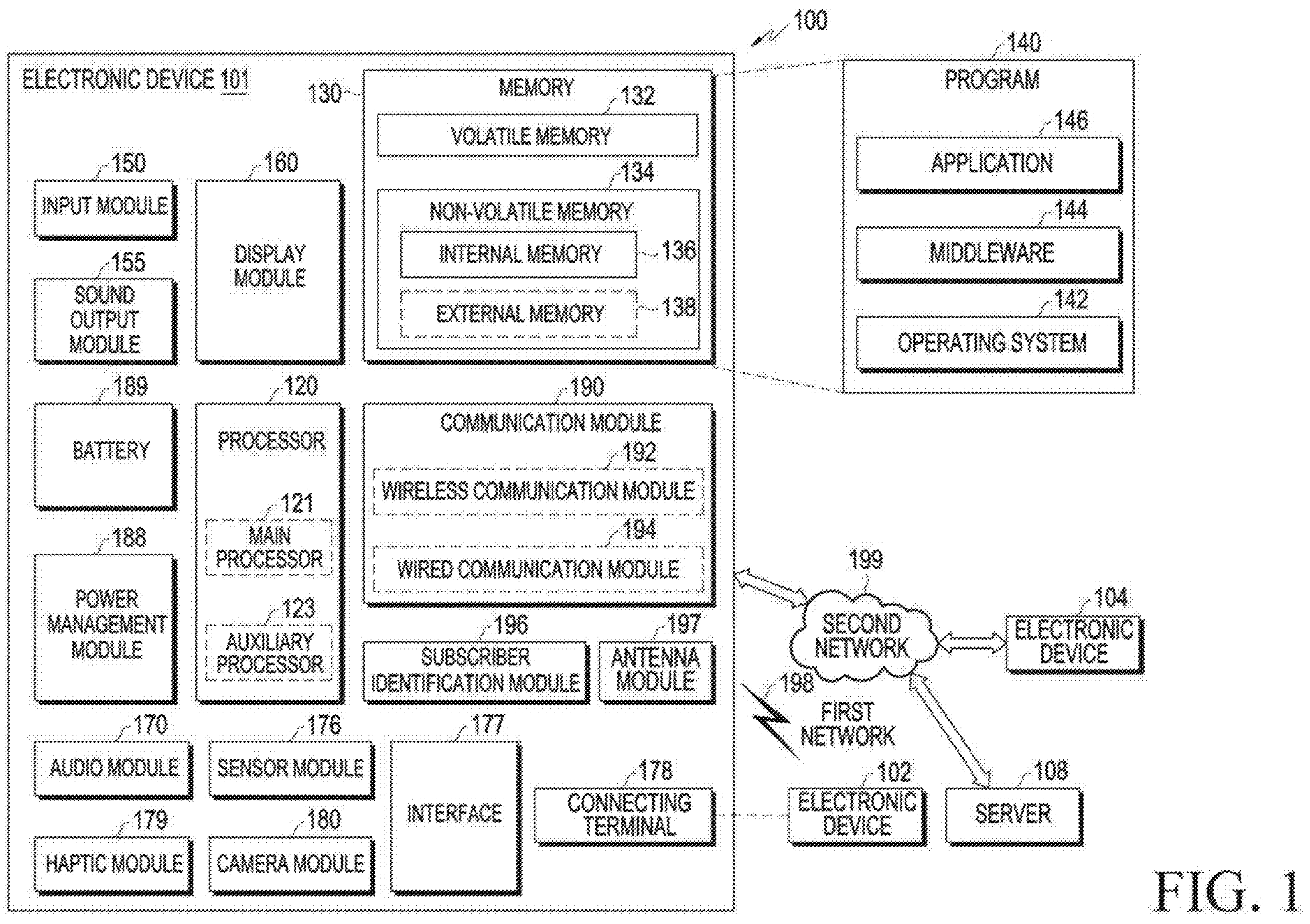
FIG. 1 is a block diagram illustrating an electronic device in a network environment according to an embodiment.

FIG. 1 is a block diagram illustrating an electronic device 101 in a network environment 100 according to an embodiment of the disclosure. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)).

These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

An electronic device according to embodiment(s) of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Embodiments of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the following detailed descriptions, a length direction, a width direction, and/or a thickness direction of an electronic device may be mentioned, the length direction may refer to the "Y-axis direction", the width direction may refer to the "X-axis direction", and/or the thickness direction may refer to the "Z-axis direction". In an embodiment, in connection with the direction in which an element is oriented, in addition to the orthogonal coordinate system illustrated in the drawings, "negative/positive (−/+)" may be mentioned together therewith. For example, the front surface of an electronic device or a housing may be defined as "a surface facing the +Z direction", and the rear surface thereof may be defined as "a surface facing the −Z direction". In an embodiment, a side surface of an electronic device or a housing may include a region facing the +X direction, a region facing the +Y direction, a region facing the −X direction, and/or a region facing the −Y direction. In an embodiment, "the X-axis direction" may have a meaning including both "the −X direction" and "the +X direction". The foregoing is based on the orthogonal coordinate system illustrated in the drawings for the sake of brevity of descriptions, and it should be noted that the directions or descriptions of elements do not limit the various embodiments disclosed in the disclosure.

Figure 2:
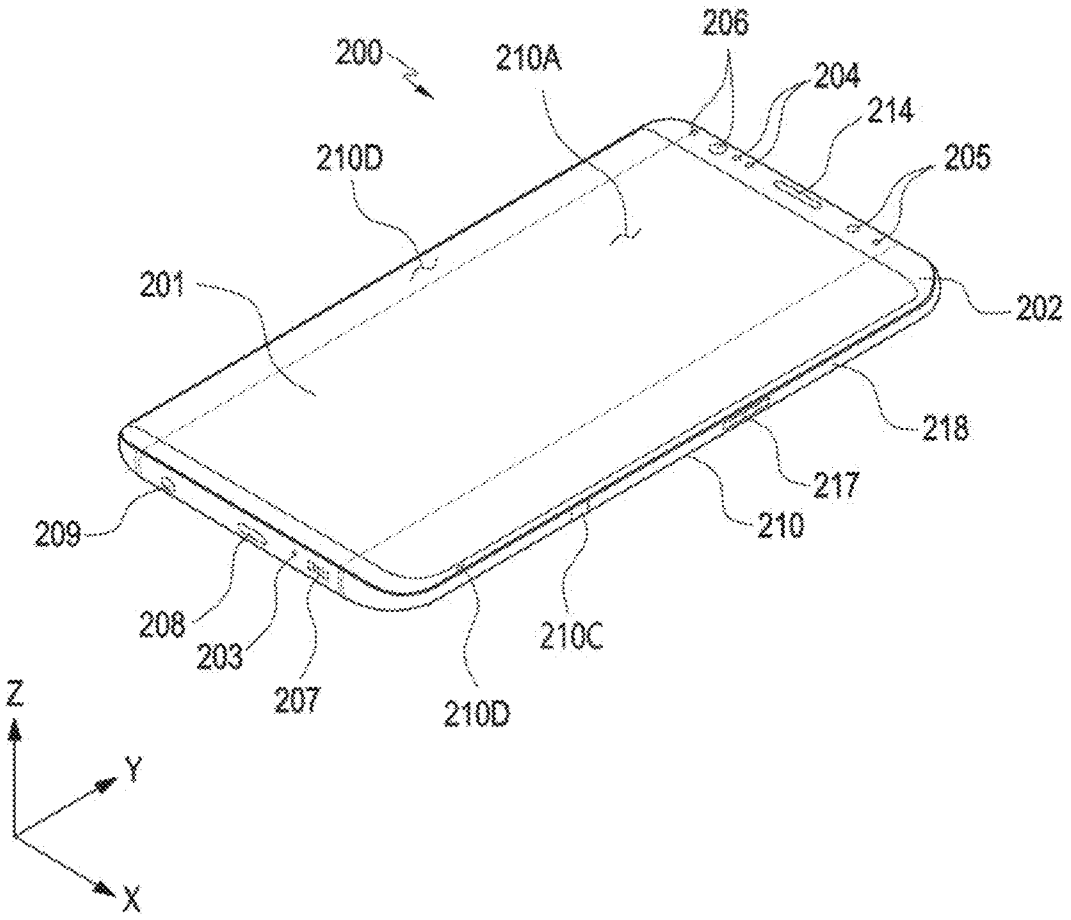
FIG. 2 is a front perspective view illustrating an electronic device according to an embodiment.
Figure 3:
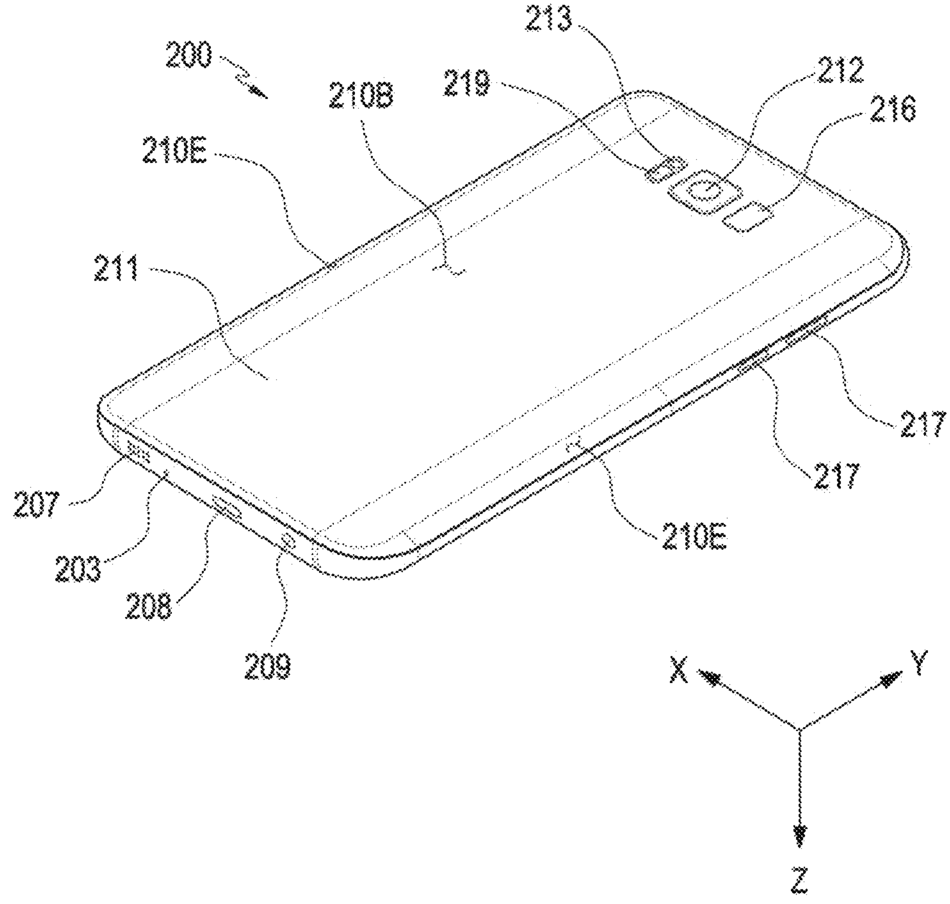
FIG. 3 is a rear perspective view illustrating an electronic device shown in FIG. 2 according to an embodiment.

FIG. 2 is a front perspective view illustrating an electronic device (200) according to an embodiment of the disclosure. FIG. 3 is a rear perspective view illustrating the electronic device (200) shown in FIG. 2 according to an embodiment of the disclosure.

Referring to FIGS. 2 and 3, the electronic device 200 according to an embodiment may comprise a housing 310 including a first surface (or a front surface) 210A, a second surface (or a rear surface) 210B, and a side surface 210C surrounding a space defined between the first surface 210A and the second surface 210B. In an embodiment, the housing may refer to a structure that forms some of the first surface 210A, the second surface 210B and the side surface 210C of FIG. 2. According to an embodiment, at least a portion of the first surface 210A may be formed by a substantially transparent front plate 202 (e.g., a glass plate or a polymer plate including various coating layers). The second surface 210B may be formed by a substantially opaque rear plate 211. The rear plate 211 may be formed of, for example, coated or colored glass, ceramic, a polymer, or a metal (e.g., aluminum, stainless steel (STS), or magnesium), or a combination of two or more of these materials. The side surface 210C may be formed by a side structure (or a side bezel structure) 218 coupled to the front plate 202 and the rear plate 211 and including a metal and/or a polymer. In an embodiment, the rear plate 211 and the side structure 218 may be integrally formed, and include the same material (e.g., a metal material such as aluminum).

In the illustrated embodiment, the front plate 202 may include two first areas 210D, which seamlessly and bendingly extend from the first surface 210A towards the rear plate 211, on both the long edges of the front plate 202. In the illustrated embodiment (see FIG. 3), the rear plate 211 may include two second areas 210E, which bendingly and seamlessly extend from the second surface 210B towards the front plate 202, on both the long edges thereof. According to an embodiment, the front plate 202 (or the rear plate 211) may include only one of the first areas 210D (or the second areas 210E). In an embodiment, some of the first areas 210D or the second areas 210E may not be included. In the above embodiments, when viewed from a side of the electronic device 200, the side structure 218 may have a first thickness (or width) for a side that does not include the first areas 210D or the second areas 210E, and may have a second thickness, which is smaller than the first thickness, for a side that includes the first areas 210D or the second areas 210E.

According to an embodiment, the electronic device 200 may include at least one or more of a display 201, audio modules 203, 207, and 214, sensor modules 204, 216, and 219, camera modules 205, 212, and 213, a key input device 217, a light-emitting element 206, and connector holes 208 and 209. In an embodiment, at least one of the components (e.g., the key input device 217 or the light-emitting element 206) may be omitted from the electronic device 200, or the electronic device 200 may additionally include other components.

The display 201 may be visually exposed, for example, through a large portion of the front plate 202. In an embodiment, at least a portion of the display 201 may be exposed through the first surface 210A, and the front plate 202 forming the first areas 210D of the side surface 210C. In an embodiment, the edges of the display 201 may be formed to be substantially the same as the contour shape of the front plate 202 adjacent thereto. In an embodiment, the interval between the outer edge of the display 201 and the outer edge of the front plate 202 may be formed to be substantially constant in order to enlarge the visually exposed area of the display 201.

In an embodiment, the screen display area of the display 201 may form a recess or an opening in a portion thereof, and may include at least one or more of the audio module 214, the sensor module 204, the camera module 205, and the light-emitting element 206, which are aligned with the recess or the opening. In an embodiment, at least one or more of the audio module 214, the sensor module 204, the camera module 205, the fingerprint sensor 216, and the light-emitting element 206 may be included on the rear surface of the screen display area of the display 201. In an embodiment, the display 201 may be coupled to or disposed adjacent to a touch-sensing circuit, a pressure sensor capable of measuring the intensity of the touch (pressure), and/or a digitizer detecting a magnetic field type stylus pen. In an embodiment, at least part of the sensor modules 204, and 219, and/or, at least part of the key input device 217 may be disposed in the first areas 210D and/or the second areas 210E.

The audio modules 203, 207, and 214 may include, for example, a microphone hole 203 and speaker holes 207 and 214. The microphone hole 203 may include a microphone disposed therein so as to acquire external sound, and in an embodiment, a plurality of microphones may be disposed therein to be able to detect the direction of a sound. The speaker holes 207 and 214 may include an external speaker hole 207 and a phone call receiver hole 214. In an embodiment, the speaker holes 207 and 214 and the microphone hole 203 are implemented as a single hole, or a speaker may be included without the speaker holes 207 and 214 (e.g., a piezo speaker).

The sensor modules 204, 216, and 219 may generate an electrical signal or a data value corresponding to, for example, an internal operating state or external environmental state of the electronic device 200. The sensor modules 204, 216, and 219 may include, for example, a first sensor module 204 (e.g., a proximity sensor) and/or a second sensor module (e.g., a fingerprint sensor) which are disposed on the first surface 210A of the housing 210, and/or a third sensor module 219 (e.g., an HRM sensor), and/or a fourth sensor module 216 (e.g., a fingerprint sensor) which are disposed on the second surface 210B of the housing 210. The fingerprint sensor may be disposed not only on the first surface 210A (e.g., the display 201) of the housing 210, but also on the second surface 210B. The electronic device 200 may further include at least one of the sensor modules 176 of FIG. 1, such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, and an illuminance sensor.

The camera modules 205, 212, and 213 may include, for example, a first camera device 205 disposed on the first surface 210A of the electronic device 200, and a second camera device 212 and/or a flash 213 disposed on the second surface 210B. The camera modules 205 and 212 may include one or more lenses, an image sensor, and/or an image signal processor. The flash 213 may include, for example, a light-emitting diode or a xenon lamp. In an embodiment, two or more lenses (e.g., an infrared camera lens, a wide-angle lens, and a telephoto lens) and image sensors may be disposed on one surface of the electronic device 200.

The key input device 217 may be disposed on the side surface 210C of the housing 210. In an embodiment, the electronic device 200 may not include some or all of the above-mentioned key input device 217, and the key input device 217, which is not included therein, may be implemented in another form such as a soft key on the display 201. In an embodiment, the key input device may include a sensor module 216 disposed on the second surface 210B of the housing 210.

The light-emitting element 206 may be disposed on, for example, the first surface 210A of the housing 210. The light-emitting element 206 may provide, for example, state information of the electronic device 200 in the form of light. In an embodiment, the light-emitting element 206 may provide a light source that interacts with, for example, the operation of the camera module 205. The light-emitting element 206 may include, for example, an LED, an IR LED, and a xenon lamp.

The connector holes 208 and 209 may include, for example, a first connector hole 208 capable of accommodating a connector (e.g., a USB connector) for transmitting/receiving power and/or data to/from an external electronic device, and/or a second connector hole 209 (e.g., an earphone jack) capable of accommodating a connector for transmitting/receiving an audio signal to/from an external electronic device.

Figure 4:
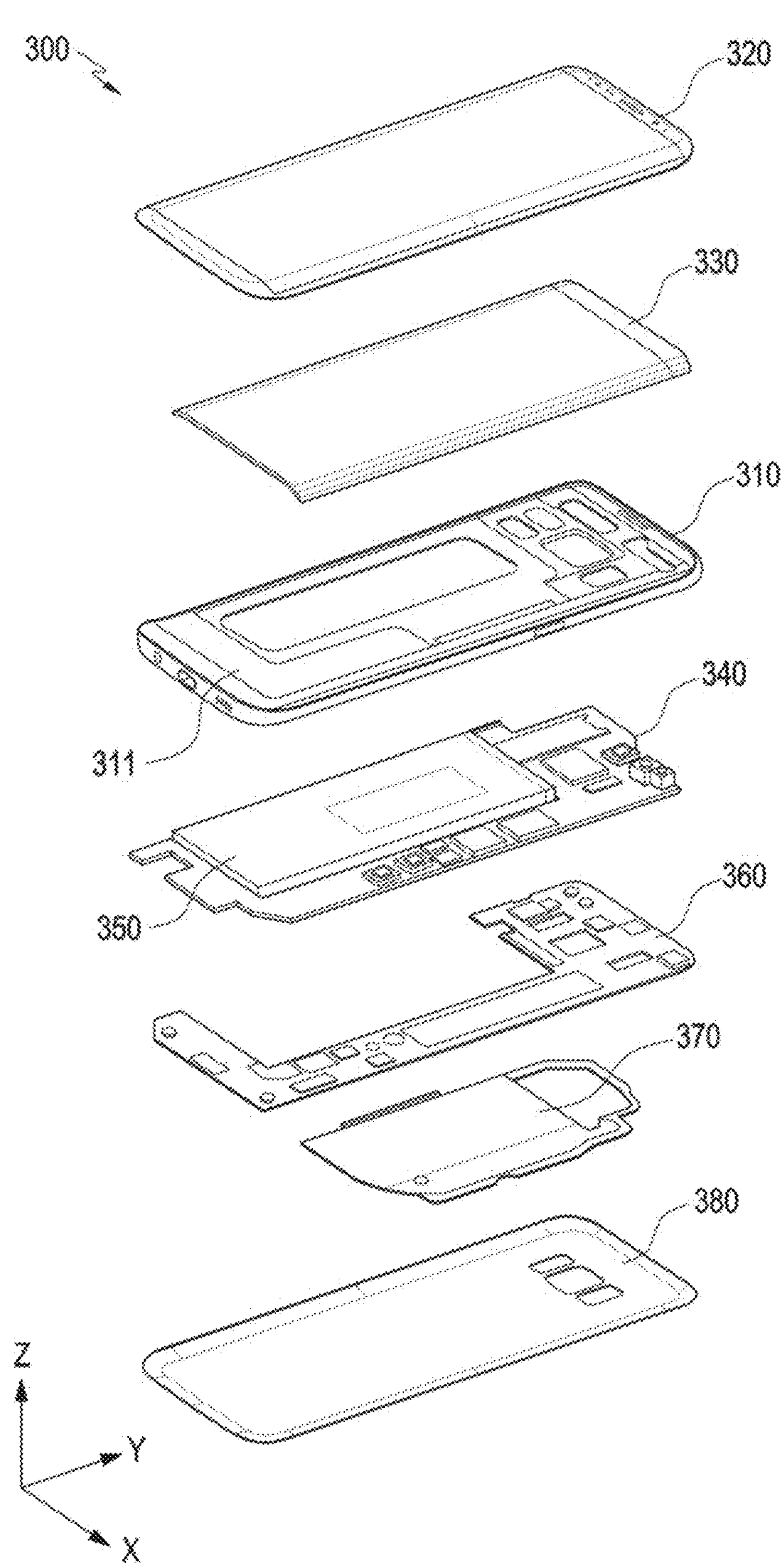
FIG. 4 is an exploded perspective view illustrating an electronic device according to an embodiment.

FIG. 4 is an exploded perspective view illustrating an electronic device 200 shown in FIG. 2 according to an embodiment of the disclosure.

Referring to FIG. 4, an electronic device 300 (e.g., the electronic device 200 of FIG. 2 or FIG. 3) may include a side structure 310 (e.g., the side structure 218 of FIG. 2), a first support member 311 (e.g., a bracket), a front plate 320 (e.g., the front plate 202 of FIG. 2), a display 330 (e.g., the display 201 of FIG. 2), a printed circuit board 340 (e.g., a printed circuit board (PCB), a printed board assembly (PBA), a flexible PCB (FPCB), or a rigid flexible PCB (RFPCB)), a battery 350, a second support member 360 (e.g., a rear case), an antenna 370, and a rear plate 380 (e.g., the rear plate 211 of FIG. 3). In an embodiment, in the electronic device 300, at least one of the components (e.g., the first support member 311 or the second support member 360) may be omitted, or other components may be additionally included. At least one of the components of the electronic device 300 may be the same as or similar to at least one of the components of the electronic device 200 in FIG. 2 or FIG. 3, and a redundant description thereof will be omitted below.

The first support member 311 may be disposed inside the electronic device 300 to be connected to the side structure 310, or may be integrated with the side structure 310. The first support member 311 may be formed of, for example, a metal material and/or a non-metal material (e.g., a polymer). The display 330 may be coupled to one surface of the first support member 311, and the printed circuit board 340 may be coupled to the other surface of the first support member 311. A processor, a memory, and/or an interface may be mounted on the printed circuit board 340. The processor may include one or more of, for example, a central processing unit, an application processor, a graphics processor, an image signal processor, a sensor hub processor, or a communication processor.

The memory may include, for example, a volatile memory or a nonvolatile memory.

The interface may include, for example, a high definition multimedia interface (HDMI), a universal serial bus (USB) interface, an SD card interface, and/or an audio interface. The interface may electrically or physically connect, for example, the electronic device 300 to an external electronic device, and may include a USB connector, an SD card/an MMC connector, or an audio connector.

The battery 350, which is a device for supplying power to at least one component of the electronic device 300, may include, for example, a non-rechargeable primary battery, a rechargeable secondary battery, or a fuel cell. At least a portion of the battery 350 may be disposed on substantially the same plane as, for example, the printed circuit board 340. The battery 350 may be integrally disposed inside the electronic device 300, or may be detachably disposed on the electronic device 300.

The antenna 370 may be disposed between the rear plate 380 and the display 350. The antenna 370 may include, for example, a near field communication (NFC) antenna, a wireless charging antenna, and/or a magnetic secure transmission (MST) antenna. The antenna 370 may perform short-range communication with, for example, an external electronic device, or may wirelessly transmit/receive power required for charging to/from the external device. In an embodiment, an antenna structure may be formed with a part of the side structure 310 and/or the first support member 311, or a combination thereof.

In the detailed descriptions below, it is noted that the electronic devices 101, 102, 104, 200, or 300 in the preceding embodiment may be referred to, and the same reference numerals will be given to the components, which may be easily understood from the preceding embodiment or omitted and detailed descriptions thereon may also be omitted.

Figure 5:
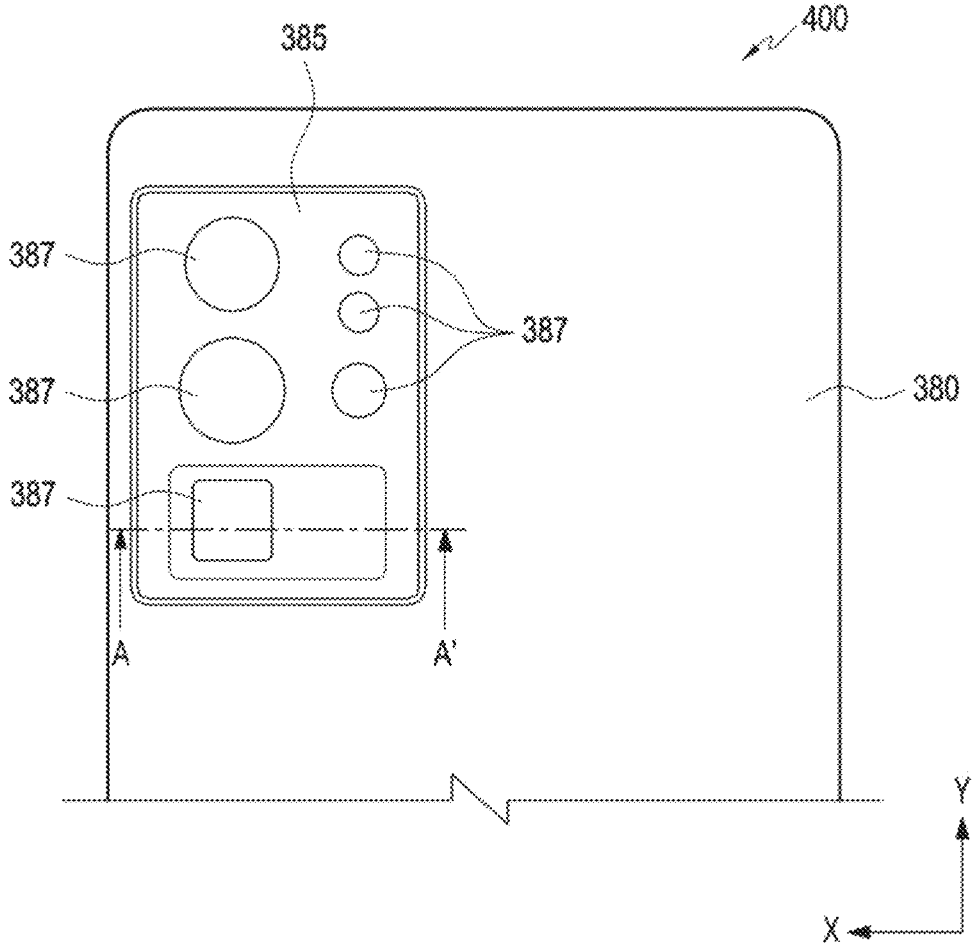
FIG. 5 is a rear plan view illustrating a rear surface of an electronic device according to an embodiment.
Figure 6:
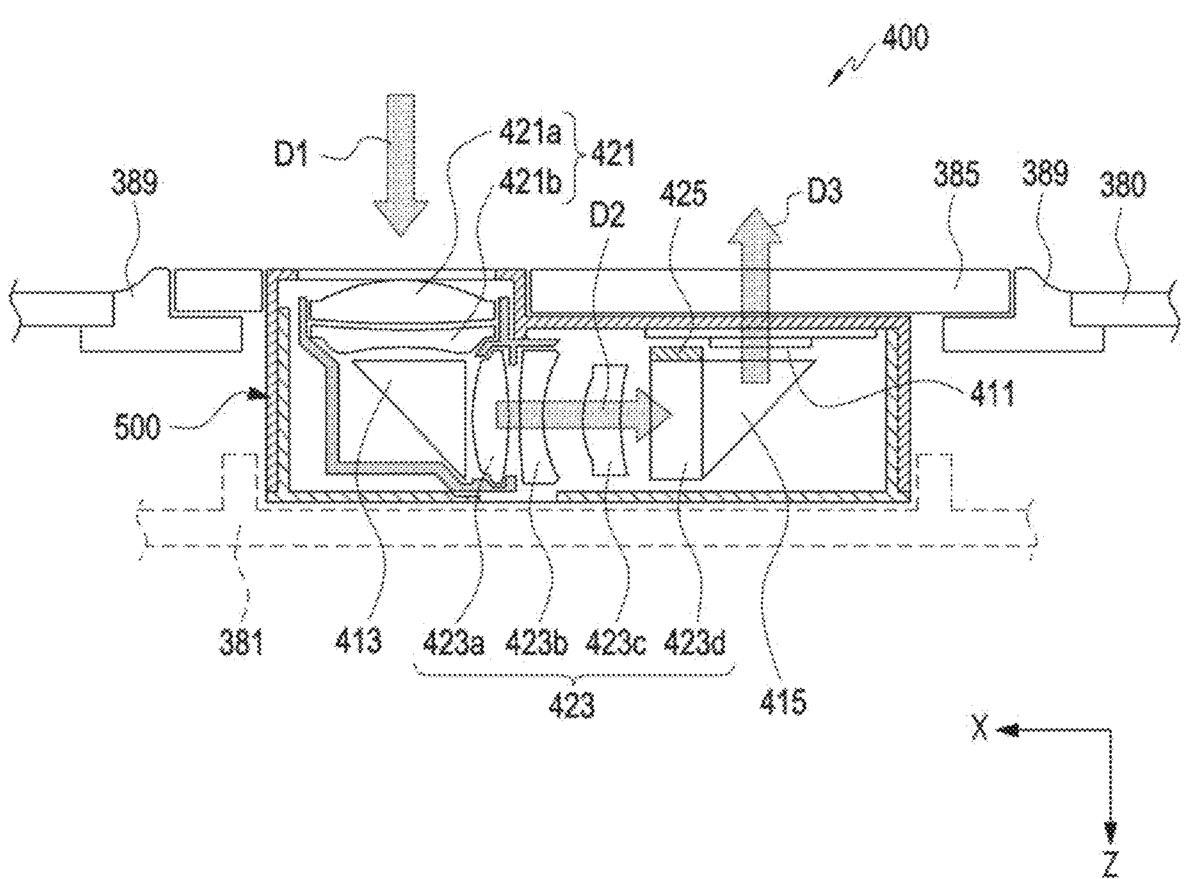
FIG. 6 is a cross-sectional view of a portion of the electronic device shown in FIG. 5 taken along line AA' according to an embodiment.
Figure 7:
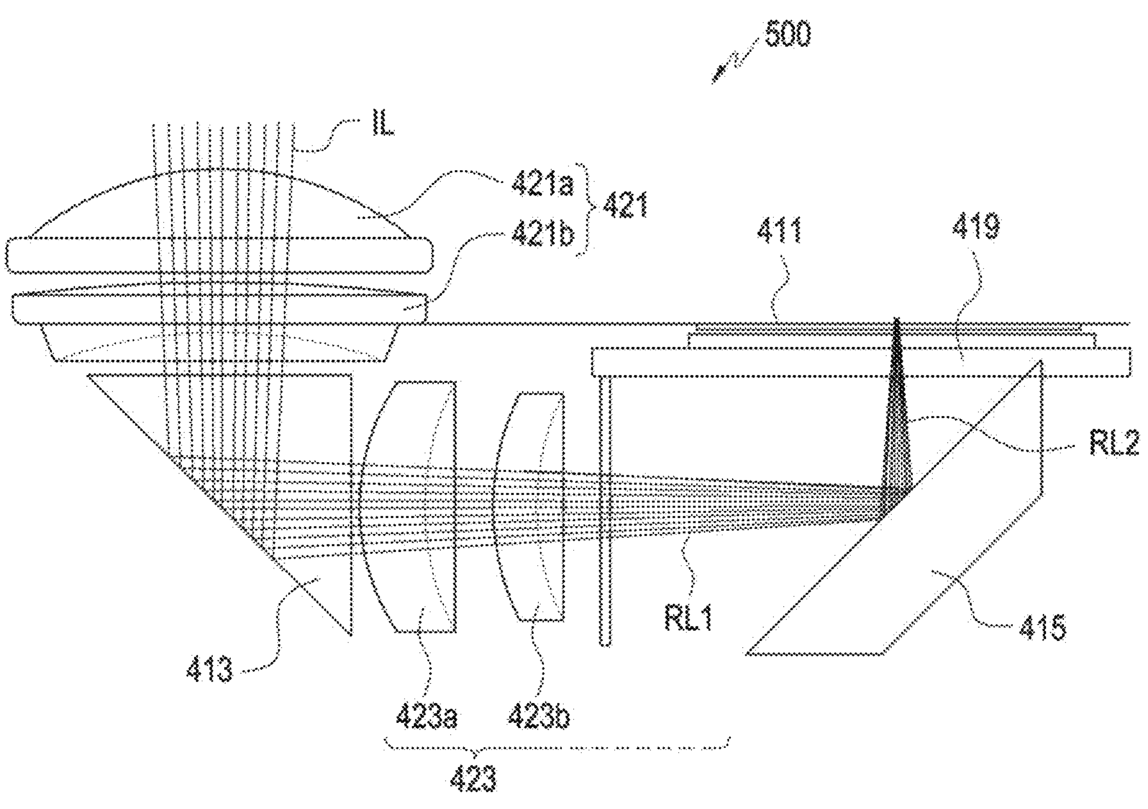
FIG. 7 is a view illustrating an optical path of a camera module in an electronic device according to an embodiment.

FIG. 5 is a rear plan view illustrating an electronic device 400 (e.g., the electronic device 101, 102, 104, 200, or 300 of FIGS. 1-4) according to an embodiment of the disclosure. FIG. 6 is a cross-sectional view of a portion of the electronic device 400 of FIG. 5, taken along the A-A', according to an embodiment of the disclosure. FIG. 7 is a view illustrating an optical path of an image capturing device 500 in the electronic device 400 according to an embodiment of the disclosure.

Referring to FIGS. 5 and 6, the electronic device 400 according to an embodiment of the disclosure may include a camera window 385 disposed on one surface thereof (e.g., the second surface 210B of FIG. 3). In an embodiment, the camera window 385 may be a part of the rear plate 380. In an embodiment, the camera window 385 may be coupled to the rear plate 380 through a decoration member 389, and when viewed from the outside, the decoration member 389 may be exposed in a form of surrounding the circumference of the camera window 385. According to an embodiment, the camera window 385 may include multiple transparent areas 387, and the electronic device 400 may receive external light or emit light to the outside through at least one of the transparent areas 387. For example, the electronic device 400 may include at least one camera module 500 (e.g., the camera modules 180, 205, 212, and 213 of FIGS. 1 to 3) disposed to correspond to at least some of the transparent areas 387, and at least one light source (e.g., an infrared light source) disposed to correspond to other parts of the transparent areas 387. In an embodiment, the image capturing device 500 or the light source may receive external light or emit light to the outside of the electronic device 400 through one of the transparent areas 387. In an embodiment, the electronic device 400 and/or the image capturing device 500 may further include a camera support member 381. The camera support member 381 may allow at least one of the image capturing device 500 and/or other image capturing devices (e.g., a wide-angle camera, an ultra-wide-angle camera, and/or a close-up camera) adjacent thereto to be disposed or fixed inside the rear plate 380 or the camera window 385. In an embodiment, the camera support member 381 may be substantially a portion of the first support member 311 and/or the second support member 360 of FIG. 4.

According to an embodiment, the electronic device 400 may include, as the image capturing device 500 or a light-receiving element, at least one of a wide-angle camera, an ultra-wide-angle camera, a close-up camera, a telephoto camera, or an infrared photodiode, and may include a flash (e.g., the flash 213 of FIG. 3) or an infrared laser diode as a light source or a light-emitting element. In an embodiment, the electronic device 400 may be configured to, using an infrared laser diode and an infrared photodiode, emit an infrared laser toward a subject and receive the infrared laser reflected by the subject, to thereby detect the distance or depth to the subject. In an embodiment, the electronic device 400 may be configured to photograph an image of a subject by one or a combination of two or more of the cameras, and to provide illumination toward the subject using a flash as necessary.

According to an embodiment, a wide-angle camera, an ultra-wide angle camera, or a close-up camera of the cameras may have a smaller length in the optical axis direction of a lens(es) as compared to a telephoto camera (e.g., the image capturing device 500). For example, a lens(es) 423*a*, 423*b*, or 423*c* of the telephoto camera (e.g., the image capturing device 500), which has a relatively large focal length, may have a total length larger than that of other cameras. The 'total length' may be a distance from an object-side surface of a first lens on an object side to the imaging surface of the image sensor 411. As in an embodiment (e.g., the image capturing device 600 of FIG. 8) described below, when other optical member(s) (e.g., a mirror or a prism) is disposed between the lens(es) and the image sensor, the 'total length' may be a distance from an object-side surface of the first lens on the object side to a sensor-side surface of the first lens on the image sensor side. In an embodiment, although the lens(es) of the wide-angle camera, the ultra-wide-angle camera, or a close-up camera is arranged along the direction of the thickness (e.g., the thickness measured in the Z-axis direction of FIG. 4 or 6) of the electronic device 400, the influence on the thickness of the electronic device 400 may be substantially small. For example, the wide-angle camera, the ultra-wide-angle camera, or the close-up camera may be disposed in the electronic device 400 such that the direction in which light is incident from the outside to the electronic device 400 and the direction of the optical axis of the lens(es) are substantially the same. In an embodiment, as compared with the wide-angle camera, the ultra-wide-angle camera, or the close-up camera, the image capturing device 500 (e.g., a telephoto camera) has a small angle of view but may be useful for capturing a subject at a greater distance and may include more the lens(es) 421*a*, 423*a*, 423*b* and 423*c*. For example, when the lens(es) 423*a*, 423*b*, or 423*c* of the image capturing device 500 is arranged in the thickness direction (e.g., the Z-axis direction) of the electronic device 400, the thickness of the electronic device 400 may increase or a significant portion of the image capturing device 500 may protrude to the outside of the electronic device 400. In an embodiment of the disclosure, the image capturing device 500 may include at least one refractive member 413 or 415 for reflecting or refracting incident light IL in a different direction. In implementing the telescopic function, the lens(es) 423*a*, 423*b*, or 423*c* may be disposed to be movable forward or backward in the incident direction of light or in the traveling direction of the reflected or refracted light, thereby suppressing or reducing an increase in the thickness of the electronic device 400.

Referring to FIGS. 6 and 7, a folded camera (e.g., the image capturing device 500) may include a first refractive member 413, a second refractive member 415, an image sensor 411, and/or at least a lens system (e.g., a second lens 423*a*, 423*b* or 423*c*) or a second lens group 423 including a dummy member 423*d*. A 'folded camera' may be useful in expanding the range of adjustment of the focal length. For example, a folded camera may have a reflective member, such as a prism or mirror, disposed such that, regardless of the direction of incident external light, the direction or arrangement of lenses may be freely designed. Such an improvement in the degree of freedom regarding design of the arrangement direction of lenses in a folded camera may implement a compact telephoto camera, which may be combined with a wide-angle camera and mounted in an electronic device. In an embodiment, at least one optical member may be configured to guide or focus light RL1 reflected or refracted by the first refractive member 413 to the second refractive member 415, and prevent the light RL1 reflected or refracted by the first refractive member 413 from being directly incident on the image sensor.

According to an embodiment, the first refractive member 413 may include, for example, a prism, a mirror, or a reflective member including a mirror for reflecting light. For example, the first refractive member 413 may be formed of a prism including at least one mirror. In an embodiment, the first refractive member 413 may reflect or refract light IL incident in the first direction D1 in a second direction D2 crossing the first direction D1. The first direction D1 may refer to a direction in which light IL is incident from the outside to the electronic device 400 or the image capturing device 500 through one of the transparent areas 387 of FIG. 5, for example, when photographing a subject. In an embodiment, the first direction D1 may refer to a shooting direction, a subject direction, an oriented direction of the image capturing device 500, or a direction parallel thereto. In an embodiment, the first direction D1 may be parallel to the thickness direction or Z-axis direction of the electronic device 400.

According to an embodiment, the second refractive member 415 may include, for example, a prism, a mirror, or a reflective member including a mirror for reflecting light. For example, the second refractive member 415 may be formed of a prism including at least one mirror. For example, at least one surface of the second refractive member 415 may be formed of a prism including a mirror. In an embodiment, the second refractive member 415 may reflect or refract light RL1 reflected or refracted by the first refractive member 413 and incident along the second direction D2 in a third direction D3 crossing the second direction D2. The third direction D3 may be substantially perpendicular to the second direction D2. For example, the third direction D3 may refer to a direction parallel to the Z-axis direction. However, an embodiment of the disclosure is not limited thereto, and the third direction D3 may be the second direction D2 or a direction inclined with respect to the X-Y plane depending on the arrangement and specifications of the image capturing device 500 or the second refractive member 415 within the electronic device 400. In an embodiment, the third direction D3 may be substantially parallel to the first direction D1.

According to an embodiment, the image sensor 411 may be configured to detect light RL2 that is reflected or refracted by the second refractive member 415 and then is incident along the third direction D3. For example, light IL incident from the outside may be detected by the image sensor 411 via the first refractive member 413 and the second refractive member 415, and the electronic device 400 or the image capturing device 500 may obtain a subject image based on a signal or information detected through the image sensor 411. In an embodiment, the image sensor 411 may be dispose substantially parallel to the X-Y plane. For example, when the image capturing device 500 has an image stabilizing function of shifting the image sensor 411, the image sensor 411 may move horizontally from a plane perpendicular to the first direction D1 or the third direction D3.

According to an embodiment, when the image stabilizing operation is performed, the image sensor 411 may be shifted in the length direction (e.g., the Y-axis direction) or the width direction (e.g., the X-axis direction) of the electronic device 400. For example, the image sensor 411 may be disposed on a plane perpendicular to the first direction D1 or the third direction D3, so that in an electronic device having a small thickness (for example, a thickness of approximately 10 mm or less), it may be easy to expand a size of the image sensor 411, and/or it may be easy to secure a space for an image stabilizing operation. In an embodiment, when the image capturing device 500 is used as a telephoto camera, since an image stabilizing function is mounted thereon, it is possible to further improve the quality of a captured image. In an embodiment, when the image sensor 411 is enlarged, the performance of the image capturing device 500 may further increase.

According to an embodiment, the image capturing device 500 may further include a first lens group 421 including a lens system (e.g., at least one first lens 421*a*, or 421*b*) for guiding or focusing light IL incident in the first direction D1 to the first refractive member 413. In an embodiment, the first lens group 421 or a first lens (e.g., the first lens 421*a*) disposed on an object side of the image capturing device 500 may have positive refractive power. For example, the first lens 421*a* may be configured to focus or align light IL incident from the outside to the first refractive member 413, so that an optical system leading from the first lens 421*a* to the image sensor 411 may be miniaturized. According to an embodiment, the first lens group 421 may further include additional first lens(es) 421*b* to focus or align light incident from the outside.

According to an embodiment, the second lens group 423 may include a dummy member **423*d* and a light blocking member 425. For example, the dummy member 423*d* may be disposed, for example, inside the image capturing device 500 or the electronic device 400, and may have a cylindrical shape extending along the second direction D2, and may transmit light RL1 travelling along the second direction D2. In an embodiment, the dummy member 423*d* may be one of lenses having positive or negative refractive power. In an embodiment, the dummy member 423*d* may be a component formed integrally with one of the second lenses 423*a*, 423*b*, and 423*c* or the second refractive member 415**.

According to an embodiment, the light blocking member 425 may be formed or disposed on at least a portion of an outer circumferential surface of the dummy member **423*d*, absorbing scattering, or reflecting light. For example, the light blocking member 425 may be formed by etching or black lacquer treatment, and/or printing or depositing a reflective layer on at least a portion of the outer circumferential surface of the dummy member 423*d*. In an embodiment, light reflected or refracted by the first refractive member 413 may be partially absorbed, scattered, or reflected by the light blocking member 425. In an embodiment, the light blocking member 425 may substantially block the light reflected or refracted by the first refractive member 413 from being directly incident to the image sensor 411 without passing through the second lens group 423 and/or the second refractive member 415. For example, light (e.g., light following a path indicated by 'IL', 'RL1', or 'RL2' in FIG. 7) sequentially through the first direction D1, the second direction D2, and/or the third direction D3 in the image capturing device 500 may be incident to the image sensor 411, and light traveling along another path may be substantially blocked from being incident to the image sensor 411**.

According to an embodiment, at least one of the second lenses **423*a*, 423*b*, and 423*c* may move forward and backward between the first refractive member 413 and the second refractive member 415 along substantially the same axis as the second direction D2. For example, the electronic device 400 (e.g., the processor 120 of FIG. 1) or the image capturing device 500 may perform focal length adjustment or focusing by moving forward and backward at least one second lens 423*a*, 423*b*, or 423*c* based on substantially the same axis as the second direction D2**. A miniaturized electronic device, such as a smart phone, may have a thickness of about 10 mm, and in this case, there may be a restriction in a range in which a lens can move forward and backward in a thickness direction thereof.

According to an embodiment, the second direction D2 may be substantially parallel to the length direction (e.g., the Y-axis direction of FIG. 4), the width direction (e.g., the X-axis direction of FIG. 4) and/or the X-Y plane, and a range in which at least one second lens **423*a*, 423*b*, or 423*c* can move forward and backward may be large, compared to a general wide-angle camera that moves forward and backward in the Z-axis direction for focusing. For example, as telephoto performance in the image capturing device 500 is improved by moving the at least one second lens 423*a*, 423*b*, or 423*c* forward and backward along substantially the same axis as the second direction D2**, the degree of design freedom may be improved in securing a space that can move forward and backward for focusing or focal length adjustment.

According to an embodiment, the electronic device 400 and/or the image capturing device 500 may further include an infrared blocking filter 419. In an embodiment, the infrared blocking filter 419 may block infrared or near-infrared wavelength band light from being incident to the image sensor 411, and may be disposed in a certain location of an optical path between the first lens **421*a* and the image sensor 411. In an embodiment, the infrared blocking filter 419 is disposed at a position close to the image sensor 411, for example, between the image sensor 411 and the second refractive member 415, thereby suppressing or preventing the infrared blocking filter 419 from being visually exposed to the outside. In an embodiment, the first refractive member 413, the second refractive member 415, and/or at least one optical member (e.g., the second lens group 423) may include an infrared blocking coating layer, and in this case, the infrared blocking filter (419) may be omitted. In an embodiment, the infrared blocking coating layer may be provided on at least one of an image sensor-side surface and an object-side surface of the dummy member 423*d* or the second refractive member 415. Accordingly, the image sensor 411 may detect light substantially through the infrared blocking filter 419** (or the infrared blocking coating layer).

The refractive members 413 and 415 of the disclosure may be selectively designed according to the structure of the image capturing device 500. For example, in an embodiment, the refractive member (e.g., the second refractive member 415 of FIG. 6) may have a triangular prism shape. In an embodiment, the refractive member (e.g., the second refractive member 415 of FIG. 7) may have a trapezoidal prism shape. The shapes of the refractive members 413 and 415 are not limited to the structures illustrated in the disclosure. For example, if the refractive members 413 and 415 reflect, refract, or transmit light, the refractive members 413 and 415 may have other structures than a triangular prism or a trapezoidal prism. In an embodiment, the refractive members 413 and 415 may be arranged in various types. For example, the refractive member (e.g., the second refractive member 415 of FIG. 6) may be configured with a prism. For example, the refractive member (e.g., the second refractive member 415 of FIG. 7) may be configured with a mirror. For example, the refractive members 413 and 415 may include a substantially transparent material. For example, the refractive members 413 and 415 may be made of glass.

Figure 8:
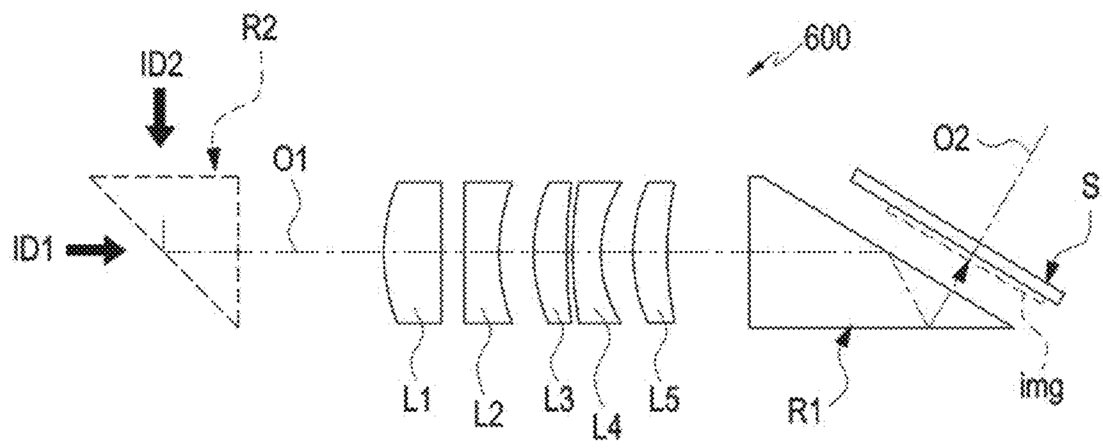
FIG. 8 is a view illustrating an image capturing device according to an embodiment.
Figure 9:
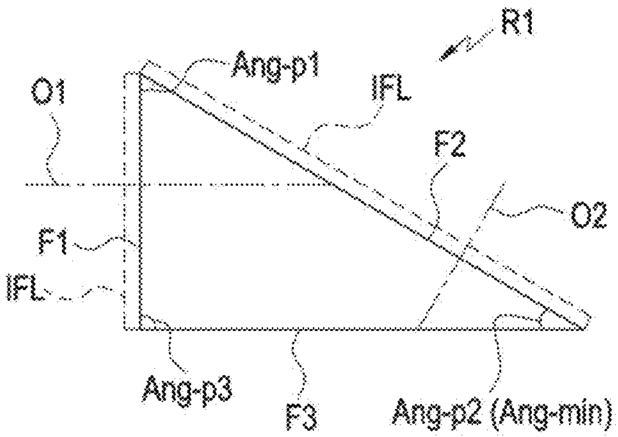
FIG. 9 is a view illustrating a first optical member of the image capturing device of FIG. 8 according to an embodiment.
Figure 10:
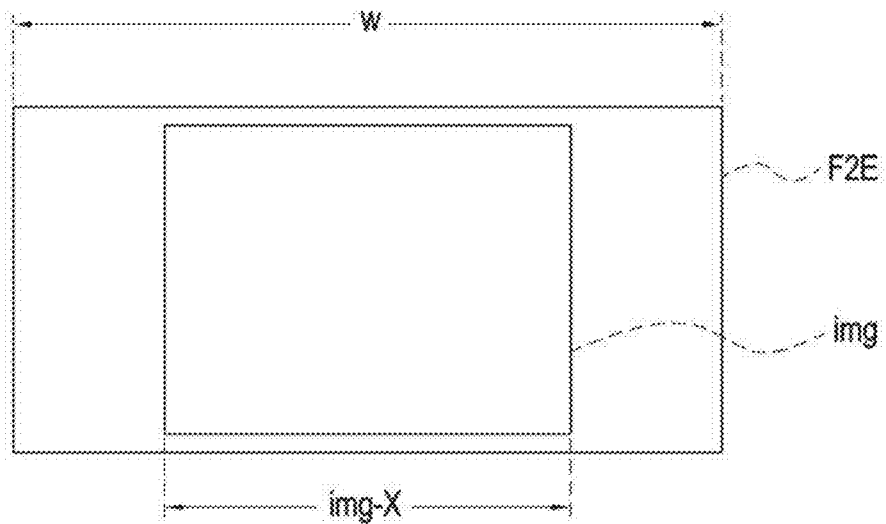
FIG. 10 is a view illustrating an imaging surface of an image sensor, and an emission surface of a first optical member, in the image capturing device of FIG. 8 according to an embodiment.

FIG. 8 is a view illustrating an image capturing device 600 according to an embodiment of the disclosure. FIG. 9 is a view illustrating a first optical member R1 of the image capturing device 600 of FIG. 8 according to an embodiment of the disclosure. FIG. 10 is a view illustrating an imaging surface img of an image sensor S, and an emission surface F2 of the first optical member R1 in the image capturing device 600 of FIG. 8 according to an embodiment of the disclosure.

Referring to FIGS. 8-10, an image capturing device 600 (e.g., the camera modules 180, 205, 212, and 213 of FIGS. 1 to 3 and/or the image capturing device 500 of FIG. 6) may include at least two lenses L1, L2, L3, L4, and L5, the image sensor S, at least one optical member R1 (hereinafter referred to as 'first optical member R1') disposed between the image sensor S and the at least two lenses (hereinafter, 'lenses (L1, L2, L3, L4, and L5)'). According to an embodiment, the image capturing device 600 may further include a second optical member R2 (e.g., the first refractive member 413 of FIG. 6 or 7) aligned with the first optical member R1 (e.g., the second refractive member 415 of FIG. 6 or 7) with the lenses L1, L2, L3, L4, and L5 interposed therebetween. The first optical member R1 may receive light condensed or guided by the lenses L1, L2, L3, L4, and L5 and reflect, refract, or guide the light in the direction of the image sensor S. In reflecting, refracting, or guiding light, the first optical member R1 may guide light towards the image sensor S by reflecting or refracting the light at least twice within the first optical member R1.

According to an embodiment, the second optical member R2 may receive external light and then reflect or refract the light to guide the light in a direction in which the lenses L1, L2, L3, L4, and L5 are aligned (e.g., the first optical axis O1 direction). For example, when the second optical member R2 is not included, the image capturing device 600 may receive external light incident in an ID1 direction, and when the second optical member R2 is included, the image capturing device 600 may receive external light from an ID2 direction different from the ID1 direction.

According to an embodiment, the image capturing device 600 may further include an infrared blocking layer IFL (or an infrared blocking coating layer). For example, the infrared blocking layer IFL may be disposed on one of a first surface (e.g., the incident surface F1) and a second surface (e.g., the emission surface F2) of the first optical member R1. In an embodiment, the infrared blocking layer IFL may be provided on any one of the surfaces of the first optical member R1 or on any one of the lenses L1, L2, L3, L4, and L5. According to an embodiment, the image capturing device 600 may further include an infrared blocking filter independent of the first optical member R1 and/or the lenses L1, L2, L3, L4, and L5. In this case, the infrared blocking layer IFL may be excluded.

According to an embodiment, at least two (e.g., five) lenses L1, L2, L3, L4, and L5 may be sequentially arranged along the first optical axis O1 direction. In an embodiment, the first optical axis O1 may be provided substantially parallel to the front surface (e.g., the first surface 210A of FIG. 2) or the rear surface (e.g., the second side 210B of FIG. 3) of the electronic device (e.g., the electronic device 101, 200, 300, or 400 of FIGS. 1 to 6). For example, even if the thickness of the electronic device 400 is reduced, a degree of freedom in design may be high in the number and arrangement of the lenses L1, L2, L3, L4, and L5. According to an embodiment, the electronic device 400 (e.g., the processor 120 of FIG. 1) and/or the image capturing device 600 may move at least one of the lenses L1, L2, L3, L4, and L5 along the first optical axis O1 direction. For example, a focal length adjustment or focusing operation may be performed by moving at least one of the lenses L1, L2, L3, L4, and L5 along the first optical axis O1 direction. In an embodiment, the image sensor S may move along the first optical axis O1 direction with respect to the lenses L1, L2, L3, L4, and L5 during the focal length adjustment or focusing operation. In an embodiment, the image sensor S may move from the center of the imaging surface img along a direction orthogonal to the imaging surface img, thereby adjusting the focal length or focusing operation. In an embodiment, as the electronic device 400 (e.g., the processor 120 of FIG. 1) and/or the image capturing device 600 moves at least one of the lenses L1, L2, L3, L4, and L5 in a direction substantially perpendicular to the first optical axis O1, thus performing an image stabilizing operation. The "move in a direction substantially perpendicular to the first optical axis O1" may be understood for example, to mean that the lens(es) L1, L2, L3, L4, or L5 is moved along at least two directions on a plane substantially perpendicular to the first optical axis O1. The "at least two directions" may refer to, for example, a direction perpendicular to each other. In an embodiment, during the image stabilizing operation, the image sensor S may move in a direction substantially perpendicular to the first optical axis O1 with respect to the lenses L1, L2, L3, L4, and L5.

According to an embodiment, the image sensor S may be configured to cause the image capturing device 600 and/or the electronic device 400 including the same to acquire an image of a subject by receiving light guided and/or condensed through the lenses L1, L2, L3, L4, and L5 and/or the first optical member R1. In an embodiment, the imaging surface img of the image sensor S may be disposed in a direction crossing the first optical axis O1. For example, the imaging surface img of the image sensor S may be disposed to form an acute angle and/or an obtuse angle with the first optical axis O1. In an embodiment, when it is said that the "imaging surface img may be disposed in a direction crossing the first optical axis O1," it may be understood that the imaging surface img is disposed to be inclined with respect to the X axis, the Y axis and/or the Z axis of FIGS. 2 to 6. In an embodiment, since the image sensor S may be disposed in various directions with respect to the alignment directions of the lenses L1, L2, L3, L4, and L5, the degree of freedom in design may be increased in manufacturing the image capturing device 600 and/or the electronic device 400 including the same.

According to an embodiment, the optical members R1 and R2 may reflect and/or refract light incident thereon to change the traveling direction of the light. For example, since at least one optical member (e.g., the first optical member R1) may be configured to be disposed between the lenses L1, L2, L3, L4, and L5 and the image sensor S, the degree of freedom in design may be increased in arrangement of the lenses L1, L2, L3, L4, and L5 and the image sensor S. In an embodiment, when a plurality of optical members is disposed between the lenses L1, L2, L3, L4, and L5 and the image sensor S, the first optical member R1 may be refer to an optical member disposed closest to the image sensor S.

According to an embodiment, the first optical member R1 may be disposed between the lenses L1, L2, L3, L4, and L5 and the image sensor S, and may receive light incident through the lenses L1, L2, L3, L4, and L5 along the first optical axis O1 direction. In an embodiment, the first optical member R1 may reflect and/or refract light incident through the lenses L1, L2, L3, L4, and L5 at least twice along the first optical axis O1 direction, thereby emitting the light along the direction of the second optical axis O2 crossing the first optical axis O1. The second optical axis O2 may be substantially understood as an optical axis of the image sensor S or the imaging surface img. In the illustrated embodiment, the second optical axis O2 is exemplified for convenience of description, and the embodiment(s) of the disclosure are not limited thereto. It should be noted that the second optical axis O2 may be defined differently depending on an embodiment and/or the structure of the image capturing device 600 to be actually manufactured.

According to an embodiment, the first optical member R1 may include a prism. The first optical member R1 may be composed of, for example, a material such as glass or synthetic resin. In an embodiment, the first optical member R1 may include a first surface (e.g., the incident surface F1) aligned to face at least two lenses (e.g., the lenses L, L2, L3, L4, or L5) on the first optical axis O1. The incident surface F1 may be, for example, perpendicular to the first optical axis O1. However, it should be noted that the embodiment(s) of the disclosure are not limited thereto. For example, an additional optical member may be disposed or the incident surface F1 may be disposed inclined with respect to the first optical axis O1 according to the specifications of the first optical member R1.

According to an embodiment, the first optical member R1 may include a second surface (e.g., the emission surface F2) facing the image sensor S. For example, the emission surface F2 may be connected to the incident surface F1 to be inclined to form a first angle Ang-p1 with respect to the incident surface F1. In an embodiment, the emission surface F2 may provide a total reflection environment for incident light (e.g., the light incident on the incident surface F1 along the first optical axis O1 direction). For example, the emission surface F2 is disposed to be inclined at a predetermined angle with respect to the first optical axis O1, to thereby reflect (or refract) incident light. In providing a total reflection environment, an inclination angle of the emission surface F2 with respect to the first optical axis O1 will be described with reference to Equations to be described below. As such, the emission surface F2 may at least partially function as a reflector inside the first optical member R1.

According to an embodiment, the first optical member R1 may include a reflective surface F3 that connects the emission surface F2 and the incident surface F1. For example, the reflective surface F3 may be connected to the emission surface F2 in a state of forming a second angle Ang-p2, and may be connected to the incident surface F1 in a state of forming a third angle Ang-p3. In an embodiment, when the reflective surface F3 is disposed substantially parallel to the first optical axis O1, the inclination angle of the emission surface F2 with respect to the first optical axis O1 may be defined as the second angle Ang-p2.

According to an embodiment, the light reflected by the emission surface F2 inside the first optical member R1 is reflected (or refracted) again by the reflective surface F3 and then may be emitted to the outside through the emission surface F2. For example, when the incident angle with respect to the emission surface F2 is smaller than a predetermined angle, the emission surface F2 inside the first optical member R1 may provide a total reflection environment, and when the incident angle is greater than the predetermined angle, the emission surface F2 may transmit light. In such a way, light incident on the first optical member R1 may be reflected (or refracted) inside the first optical member R1 at least twice and guided to the image sensor S through the emission surface F2. In an embodiment, when the image capturing device 600 has a structure including an infrared blocking layer IFL, the infrared blocking layer IFL may be disposed on at least a portion of a surface of the first optical member R1 (e.g., the incident surface F1 and/or the emission surface F2). The position and size of the infrared blocking layer IFL may be variously selected in consideration of the path of light passing through the first optical member R2. In an embodiment, the infrared blocking layer IFL may be disposed on at least one of the incident surface F1 and the emission surface F2.

According to an embodiment, the electronic device 400 (e.g., the processor 120 in FIG. 1) and/or the image capturing device 600 may perform an image stabilizing function or a subject tracking function by rotating or tilting at least one of the optical members R1 and R2 (e.g., the first optical member R1) with respect to the first optical axis O1. The "tilting operation" may be understood, for example, as an operation of rotating the first optical member R1 on a basis of an arbitrary axis crossing the first optical axis O1. The central axis of the tilting operation may be variously configured according to the structure of the image capturing device 600 and/or the electronic device 400 to be actually manufactured. In an embodiment, the image stabilizing function or subject tracking function may be implemented by rotating or tilting the image sensor S with respect to the first optical member R1.

According to an embodiment, the second optical member R2 (e.g., the first refractive member 413 of FIG. 6) may be disposed in front of the lenses L1, L2, L3, L4, and L5. For example, a direction in which light is incident on the electronic device 400 and/or the image capturing device 600 may be different from that of the first optical axis O1. As described above, when the components described above and/or to be described below regarding the image capturing device 600 of FIG. 8 are satisfied, other components of the embodiments disclosed herein (e.g., the first lens group 421, the first refractive member 413, the dummy member 423*d*, and/or the light blocking member 425 of FIG. 6) may be selectively combined to implement additional embodiments.

According to an embodiment, the image capturing device described above and/or to be described below (e.g., the image capturing device 600, 700, and 800 in FIGS. 8, 11 and/or FIG. 13) may satisfy the condition of Equation 1 below.

$$1.2 \leq \frac{w}{img - X} \leq 2.5 \qquad \text{[Equation 1]}$$

Herein, 'img-X' represents a length of a longer side of horizontal/vertical lengths of an imaging surface img of the image sensor S; and 'w' represents a length of a longer side of horizontal/vertical lengths of the emission surface F2 facing the image sensor among surfaces of an optical member (hereinafter, 'a first optical member') closest to the image sensor among the at least one optical member. In an embodiment, the longer side of the emission surface F2 indicated by 'w' in FIG. 9 may be understood as a longer side of an area through which light incident on the image sensor S passes among the emission surfaces F2 of FIG. 9. For example, an area indicated by 'F2E' in FIG. 10 of the emission surfaces F2 may be an area through which light incident on the image sensor S passes. In an embodiment, the area or size of the region indicated as 'F2E' may be smaller than a surface (e.g., the emission surface F2 of FIG. 9) of the first optical member R1.

According to an embodiment, the second surface (e.g., the emission surface F2) of the first optical member R1 and the imaging surface img of the image sensor S may be disposed substantially parallel to each other. In this case, the longer side of the emission surface F2 may be disposed substantially parallel to the longer side of the imaging surface img. In an embodiment, the longer side of the imaging surface img may be longer than adjacent other sides of the imaging surface img.

According to an embodiment, the longer side of the imaging surface img, 'img-X', may be substantially disposed parallel to the length direction (e.g., the Y-axis direction of FIG. 4) or width direction (e.g., the X-axis direction of FIG. 4 or FIG. 6) of the electronic device. In an embodiment, the longer side of the emission surface F2, 'w' may be disposed to correspond to the longer side of the imaging surface img, 'img-X'. For example, 'w', which is the longer side of the emission surface F2, may be disposed substantially parallel to the length direction (e.g., the Y-axis direction of FIG. 4) or the width direction (e.g., the X-axis direction of FIG. 4 or FIG. 6) of the electronic device. In an embodiment, the shorter side of the horizontal/vertical lengths of the imaging surface img or the shorter side of the horizontal/vertical lengths of the emission surface F2 may be disposed substantially parallel to the thickness direction of the electronic device (e.g., the Z-axis direction of FIG. 4 or FIG. 6). For example, as the image capturing device is disposed inside a miniaturized electronic device, an increase in the thickness of the electronic device that may occur due to the size of the image sensor S or the first optical member R1 may be suppressed. According to an embodiment, the longer sides of the imaging surface img and the emission surface F2 may be disposed substantially parallel to the XY plane of the electronic device, and the shorter sides of the imaging surface img and the emission surface F2 may be disposed to be inclined with respect to the XY plane of the electronic device. For example, even if the shorter sides of the imaging surface img and the emission surface F2 are longer than the thickness of the electronic device, it may be easy to arrange the image sensor S or the first optical member R1 inside the electronic device. This may be possible by improving the degree of freedom in designing a path through which light is refracted and/or reflected by using the first optical member R1.

According to an embodiment, compared to the longer sides of the imaging surface img and the emission surface F2, the length or width of the electronic device may be considerably larger. For example, since the longer sides of the imaging surface img and the emission surface F2 may be manufactured to be approximately several mm, and the length or width of the electronic device may be approximately 50 mm or more, it may be easy to enlarge the size of the image sensor S or the first optical member R1. In an embodiment, when the longer sides of the imaging surface img and the emission surface F2 are disposed parallel to the XY plane of the electronic device, and the shorter sides of the imaging surface img and the emission surface F2 are disposed inclined with respect to the XY plane of the electronic device, restrictions that may occur due to the thickness of the electronic device may be eased, so that it may be easy to enlarge the lengths of the shorter sides of the imaging surface img and the emission surface F2.

According to an embodiment, when a value according to [Equation 1] becomes less than about 1.2, stray light may increase in the acquired image. Herein, the 'stray light' may be understood as light incident traveling along other path than a specified path. For example, as stray light increases, the quality of an acquired image may deteriorate. Such stray light may be generated by unintended reflection or refraction inside the image capturing device 600. In an embodiment, when a value according to [Equation 1] is greater than about 2.5, the total length of the lens becomes small, so that it may be difficult to implement the image capturing device 600 having good optical performance. For example, when the condition according to [Equation 1] is satisfied, the image capturing device 600 may have an appropriately sized total lens length and good optical performance while suppressing stray light.

According to an embodiment, the image capturing device 600 may further include an anti-reflection coating layer disposed on at least one of the incident surface F1 or the emission surface F2 of the first optical member R1. For example, reflection or refraction that occurs when light passes through the incident surface F1 or the emission surface F2 may be suppressed. In an embodiment, reflection or refraction on the incident surface F1 (or the emission surface F2) may result in stray light. For example, stray light may be suppressed by disposing an anti-reflection coating layer on at least one of the incident surface F1 or the emission surface F2. In an embodiment, when the infrared blocking layer (IFL) is disposed on either the incident surface (F1) or the emission surface (F2), the anti-reflection coating layer may be disposed on the other one of the incident surface (F1) or the emission surface (F2).

According to an embodiment, the image capturing device described above and/or below (e.g., the image capturing device 600, 700, and 800 of FIGS. 8, 11 and/or FIG. 13) may satisfy the condition of following [Equation 2].

$$15 \leq Ang-\min \leq 50 \quad \text{[Equation 2]}$$

Herein, 'Ang-min' represents the smallest angle among angles formed by two adjacent surfaces of the first optical member R1, and may be the second angle Ang-p2 in the first optical member R1 illustrated in FIG. 9. According to an embodiment, when the value of Equation 2 is smaller than the angle of approximately 15 degrees, the size of the first optical member R1 increases, which may make it difficult to implement the electronic device (e.g., the electronic device 101, 102, 104, 200, 300, and 400 of FIGS. 1 to 6) or the image capturing device 600 to be more compact. In an embodiment, when the value of [Equation 2] is greater than the angle of approximately 50 degrees, it may be difficult to create a total reflection environment for reflecting or refracting the incident light at least twice or more inside the first optical member R1.

According to an embodiment, the incident surface F1 and the reflective surface F3 may be arranged to form a substantially right angle, and in this case, the reflective surface F3 may be substantially parallel to the first optical axis O1. In an embodiment, when the incident surface F1 and the reflective surface F3 are arranged to form a substantially right angle, the emission surface F2 may be arranged to satisfy the condition presented through [Equation 2] with respect to the reflective surface F3. In an embodiment, when the incident surface F1 and the reflective surface F3 are disposed to form a substantially right angle, the second angle Ang-p2 between the emission surface F2 and the reflective surface F3 may be approximately 25~35 degrees. In an embodiment, the first angle Ang-p2 between the incident surface F1 and the emission surface F2 may satisfy the condition presented through [Equation 2].

According to an embodiment, the image capturing device described above and/or below (e.g., the image capturing device 600, 700, and 800 of FIGS. 8, 11 and/or FIG. 13) may satisfy the condition of [Equation 3] for Vd-1 below which is the Abbe number of the first optical member R1.

$$25 \leq Vd-1 \leq 95 \quad \text{[Equation 3]}$$

According to an embodiment, the first optical member R1 is disposed between the lenses L1, L2, L3, L4, and L5 and the image sensor S (e.g., the imaging surface img), which may affect curvature or chromatic aberration. In an embodiment, when the Abbe number, Vd-1, of the first optical member R1 is greater than about 95 degrees, it may be useful to correct aberration in the image capturing device, but the strength thereof is lowered, which may cause an optical member (e.g., the first optical member R1) to be easily deformed or damaged during the assembly process, or during the manufacturing, transportation and/or storage process prior to assembly. In an embodiment, when the Abbe number, Vd-1, of the first optical member R1 is less than about 25, a risk of damage to the electronic device is reduced, but it may be difficult to control aberration. For example, when the condition of [Equation 3] for the Abbe number, Vd-1 is satisfied, the first optical member R1 may facilitate the aberration control of the image capturing device 600 without being easily damaged by an external environment.

According to an embodiment, the image capturing device described above and/or below (e.g., the image capturing device 600, 700, and 800 of FIGS. 8, 11 and/or FIG. 13) may satisfy the condition of [Equation 4] below for a Field of View (FOV).

$$5 \leq FOV \leq 35 \quad \text{[Equation 4]}$$

According to an embodiment, when the FOV is greater than about 35 degrees, the focal length of the image capturing device 600 is shortened, so that it may be difficult to arrange the first optical member R1 between the lenses L1, L2, L3, L4, and L5 and the image sensor S (e.g., the imaging surface img). In an embodiment, when the FOV is smaller than about 5 degrees, as the focal length of the image capturing device 600 increases, the image capturing device 600 may be also enlarged. For example, when the FOV is smaller than about 5 degrees, it may be difficult to mount the image capturing device 600 on a miniaturized electronic device (e.g., the electronic devices 101, 102, 104, 200, 300, and 400 of FIGS. 1 to 6). In an embodiment, when the image capturing device 600 satisfies the condition of [Equation 4] for the FOV, it is possible to provide good telephoto performance.

[Table 1] below exemplifies the values of [Equations 1-4] described above in the image capturing devices 600, 700, and 800 according to the embodiment(s) of FIGS. 8, 11 and/or 13 described above or to be described below. According to an embodiment, by satisfying the conditions presented through the [Equations 1-4] described above, the image capturing devices 600, 700, and 800 become more compact, thereby having good optical performance. In an embodiment, when the image capturing devices 600, 700, and 800 satisfy the conditions of [Equations 1-4] described above, the image capturing devices become smaller, and thus a degree of freedom in design may be increased in the arrangement of the lens(es) and/or the image sensor.

TABLE 1

Figure 11:
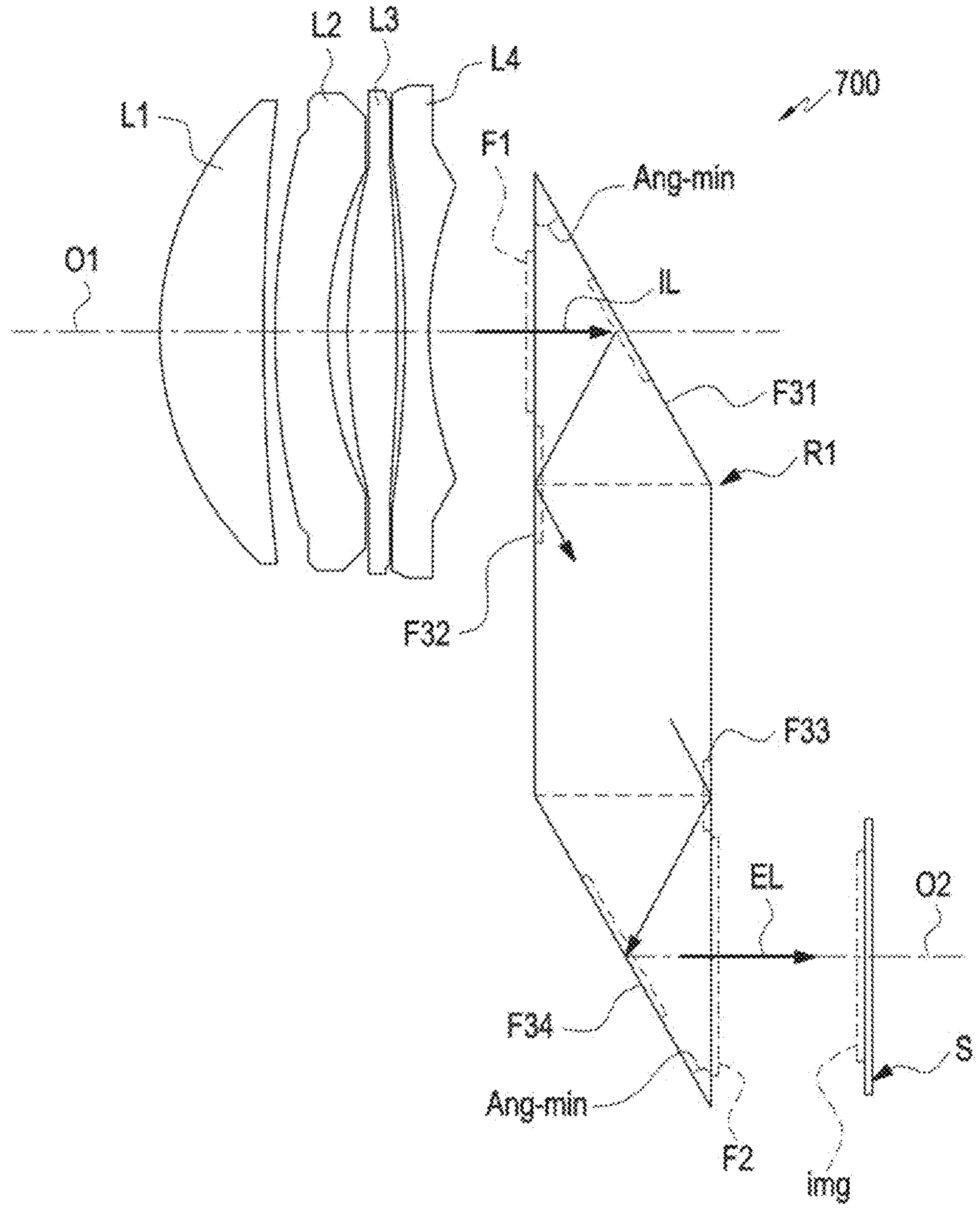
FIG. 11 is a view illustrating an image capturing device according to an embodiment.
Figure 13:
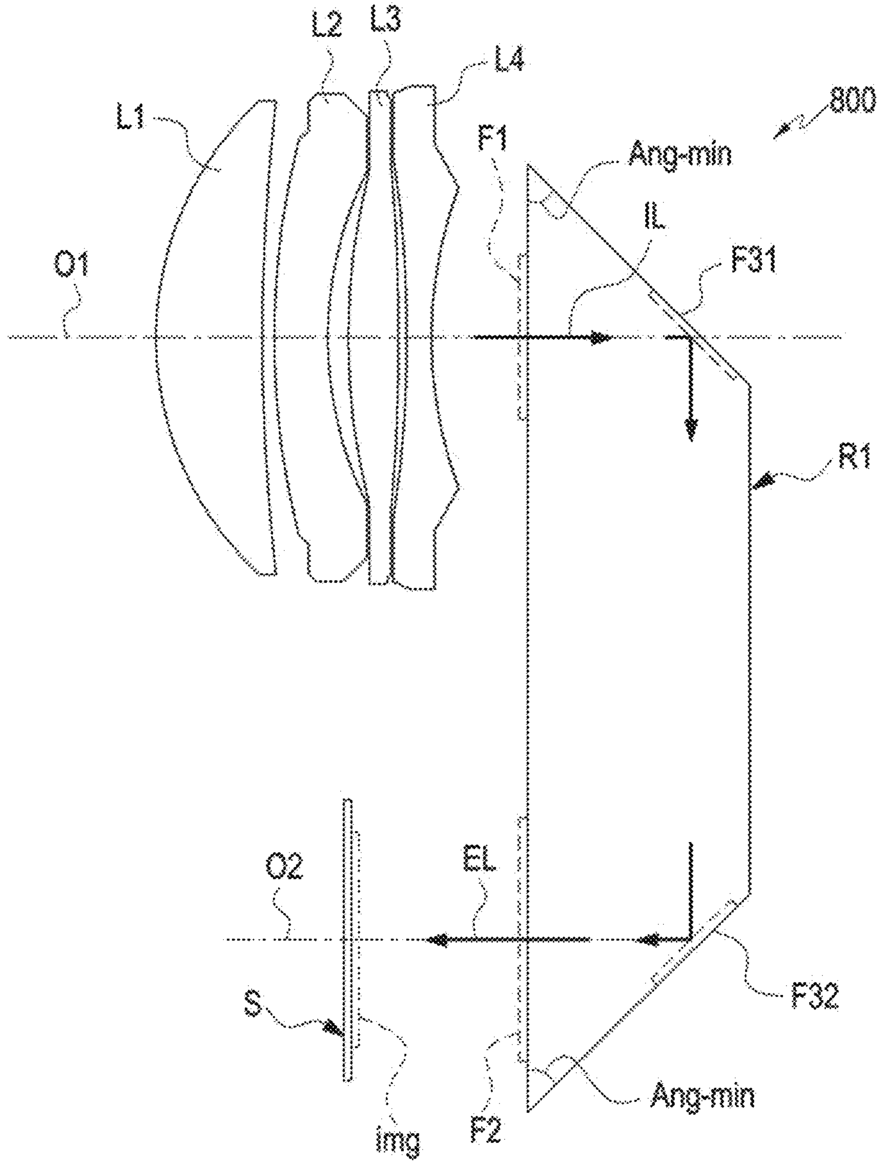
FIG. 13 is a view illustrating an image capturing device according to an embodiment.

| | Equation 1 | Equation 2 | Equation 3 | Equation 4 |
|---|---|---|---|---|
| Embodiment of FIG. 8 | 1.85 | 30 | 64.2 | 21.3 |
| Embodiment of FIG. 11 | 1.63 | 30 | 64.2 | 18.9 |
| Embodiment of FIG. 13 | 1.37 | 45 | 64.2 | 18.9 |

In the following embodiment(s), the same reference numerals in the drawings are given for components that may be easily understood through the preceding embodiments or omitted, and a detailed description thereof may also be omitted.

Figure 12:
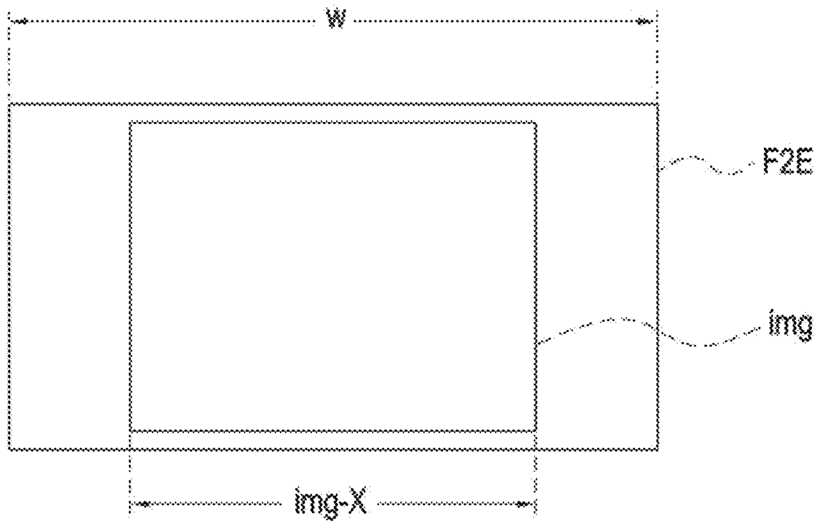
FIG. 12 is a view illustrating an imaging surface of an image sensor, and an emission surface of a first optical member, in the image capturing device of FIG. 11 according to an embodiment.

FIG. 11 is a view illustrating an image capturing device 700 according to an embodiment of the disclosure. FIG. 12 is a view illustrating an imaging surface of an image sensor, and an emission surface of the first optical member, in the image capturing device of FIG. 11 according to an embodiment of the disclosure.

Referring to FIGS. 11 and 12, the image capturing device 700 (e.g., the image capturing device 500 of FIG. 6) may include at least two (e.g., four) lenses L1, L2, L3, or L4, an image sensor S, and/or a first optical member R1, wherein the first optical member R1 may be disposed between the lenses L1, L2, L3, or L4 and the image sensor S. For example, when viewed in a direction facing the lenses L1, L2, L3, and L4, for example, such as when viewed from above the lenses L1, L2, L3, and L4 along the first optical axis O1, it may be understood that the first optical member R1 is located under the lenses L1, L2, L3, and L4 and above the image sensor S. In an embodiment, the image capturing device 700 may satisfy the above-described specifications or conditions presented through [Equations 1-4]. In an embodiment, the second optical axis O2 (e.g., the optical axis of the image sensor S) may be substantially parallel to the first optical axis O1.

According to an embodiment, the first optical member R1 may include an incident surface F1, an emission surface F2, and/or reflective surfaces F31, F32, F33, and F34. For example, light incident through the incident surface F1 may be reflected or refracted four times inside the first optical member R1. In an embodiment, some of the reflective surfaces F31, F32, F33, and F34 may be substantially disposed on the same plane as the incident surface F1 or the emission surface F2. For example, among the reflective surfaces F31, F32, F33, and F34, the first reflective surface F31 and the fourth reflective surface F34 may be disposed inclined with respect to the incident surface F1 and/or the emission surface F2, the second reflective surface F32 may be disposed on the same plane as the incident surface F1, and the third reflective surface F33 may be disposed on the same plane as the emission surface F2. For example, the incident surface F1, the emission surface F2 and/or the reflective surfaces F31, F32, F33, and F34 are defined; however, these refer to areas or points where light is transmitted, reflected, and/or refracted in the first optical member R1, and at least one of the reflective surfaces F31, F32, F33, and F34 may be arranged to form the same plane as the incident surface F1 or the emission surface F2.

According to an embodiment, the first reflective surface F31 and the fourth reflective surface F34 may be disposed substantially parallel to each other, and the incident surface F1 (and/or the second reflective surface F32) may be disposed substantially parallel to the emission surface F2 (and/or the third reflective surface F33). For example, when viewed as shown in FIG. 11, the first optical member R1 may have a substantially parallelogram shape. When the first optical member R1 has a parallelogram shape, either a first angle between the incident surface F1 and the first reflective surface F31 or a second angle between the emission surface F2 and the fourth reflective surface F34 may satisfy the condition presented through Equation 2.

According to an embodiment, light condensed by the lenses L1, L2, L3, and L4 may be incident (IL) to the incident surface (F1) along the first optical axis (O1) direction, and may be sequentially reflected or refracted by the first reflective surface F31, the second reflective surface F32, the third reflective surface F33, and/or the fourth reflective surface F34 inside the first optical member R1. In an embodiment, the light reflected or refracted by the fourth reflective surface F34 may be emitted (EL) through the emission surface F2 and guided to the image sensor S. In an embodiment, the angle, Ang-min, satisfying the condition of [Equation 2] may be an angle between the incident surface F1 and the first reflective surface F31, and/or an angle between the emission surface F2 and the fourth reflective surface F34.

Figure 14:
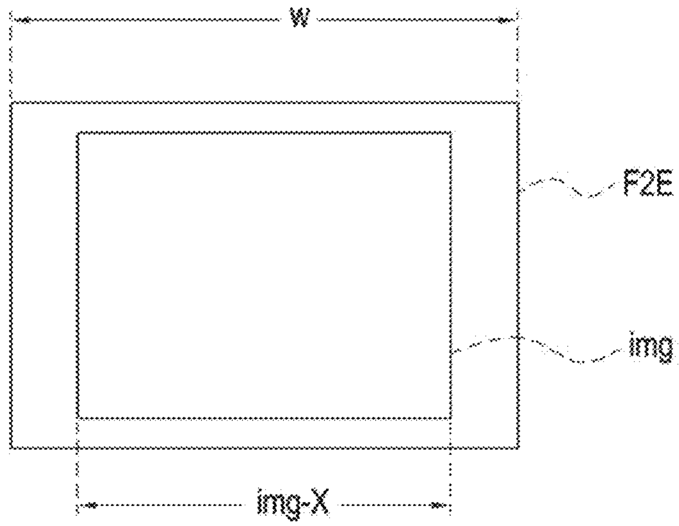
FIG. 14 is a view illustrating an imaging surface of an image sensor, and an emission surface of a first optical member, in the image capturing device of FIG. 13 according to an embodiment.

FIG. 13 is a view illustrating an image capturing device 800 according to an embodiment of the disclosure. FIG. 14 is a view illustrating an imaging surface img of an image sensor S and an emission surface F2 of a first optical member R1 in an image capturing device 800 of FIG. 13 according to an embodiment of the disclosure.

Referring to FIGS. 13 and 14, the image capturing device 800 (e.g., the image capturing device 500 of FIG. 6) may include at least two (e.g., four) lenses L1, L2, L3, and L4, an image sensor S, and/or a first optical member R1, wherein the first optical member R1 may be disposed on an optical path between the lenses L1, L2, L3, and L4 and the image sensor S. For example, when viewed in the direction facing the lenses L1, L2, L3, and L4, such as from above along the first optical axis O1, the first optical member R1 may be located under the lenses L1, L2, L3, and L4 and/or the image sensor S, enabling it to implement a portion of the optical path between the lenses L1, L2, L3, and L4 and the image sensor S. In an embodiment, the image capturing device 800 may satisfy the above-described specifications or conditions presented through [Equations 1-4]. In an embodiment, the second optical axis O2 (e.g., the optical axis of the image sensor S) may be substantially parallel to the first optical axis O1.

According to an embodiment, the first optical member R1 may include an incident surface F1, an emission surface F2, and/or reflective surfaces F31, and F32. For example, light incident through the incident surface F1 may be reflected or refracted at least twice inside the first optical member R1. In an embodiment, the incident surface F1 and the emission surface F2 may be substantially disposed on the same plane on the first optical member R1 and understood as different areas. In an embodiment, the reflective surfaces F31, and F32 may be disposed inclined with respect to the incident surface F1 and/or the emission surface F2, and may be substantially inclined in opposite directions with respect to each other.

According to an embodiment, light condensed by the lenses L1, L2, L3, and L4 may be incident (IL) on the incident surface (F1) along the first optical axis (O1) direction, and may be sequentially reflected or refracted by the first reflective surface F31, and/or the second reflective surface F32 inside the first optical member R1. In an embodiment, the light reflected or refracted by the second reflective surface F32 may be emitted (EL) through the emission surface F2 and guided to the image sensor S. In an embodiment, the angle, Ang-min, satisfying the condition of [Equation 2] may be an angle between the incident surface F1 and the first reflective surface F31, and/or an angle between the emission surface F2 and the second reflective surface F32.

Figure 15:
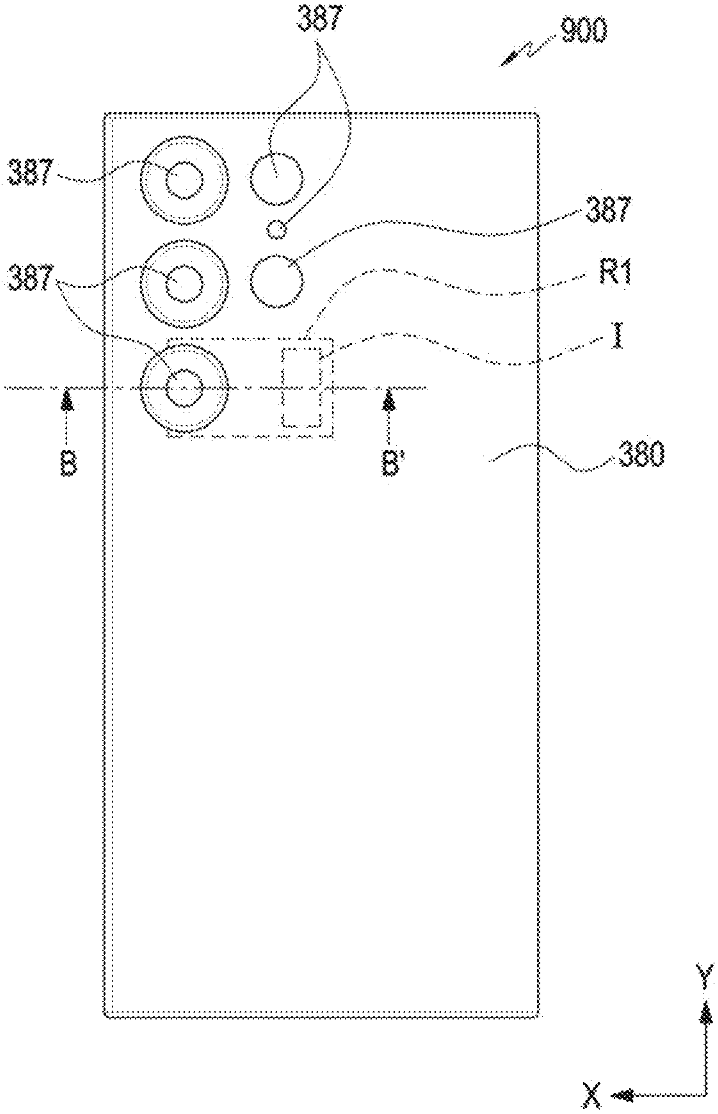
FIG. 15 is a plan view illustrating a rear surface of an electronic device including an image capturing device according to an embodiment.
Figure 16:
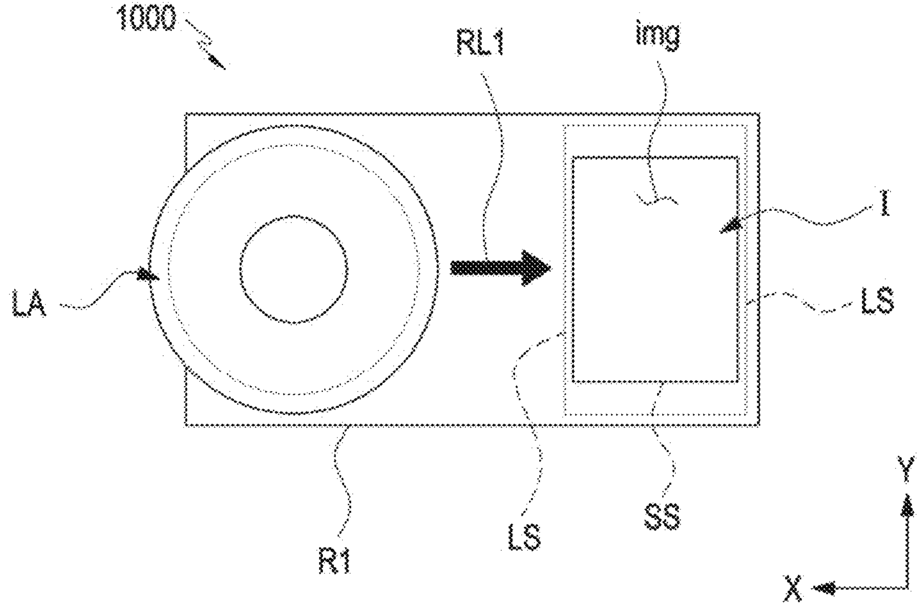
FIG. 16 is a plan view illustrating an image capturing device of the electronic device of FIG. 15, according to an embodiment.
Figure 17:
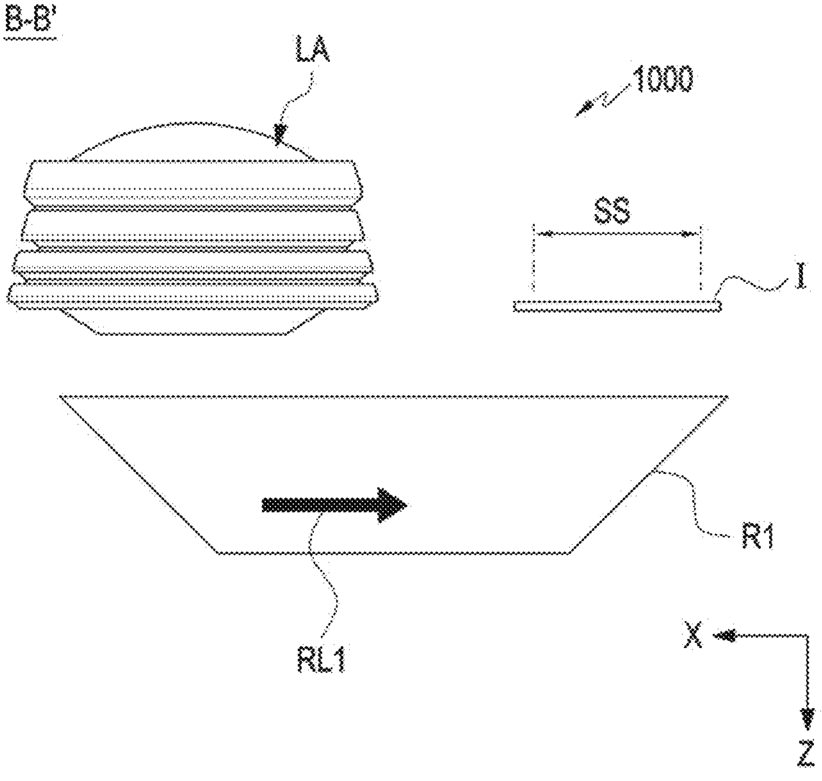
FIG. 17 is a view illustrating the image capturing device of FIG. 15, taken along line B-B' according to an embodiment.

FIG. 15 is a plan view illustrating a rear surface of an electronic device 900 (e.g., the electronic devices 101, 102, 104, 200, 300, or 400 of FIGS. 1 to 6) including an image capturing device (e.g., the camera module 180, 205, 212, or 213 of FIGS. 1 to 3 or the image capturing device 500, 600, or 700 of FIGS. 6-8 and/or FIG. 13) according to an embodiment of the disclosure. FIG. 16 is a plan view illustrating an image capturing device 1000 of the electronic device 900 of FIG. 15, according to an embodiment of the disclosure. FIG. 17 is a view of the image capturing device 1000 of FIG. 15, taken along line B-B' according to an embodiment of the disclosure.

Referring to FIGS. 15 to 17, the image capturing device 1000 may include a lens assembly or a lens layout LA (e.g., the lenses L1, L2, L3, L4, or L5 of FIGS. 8, 11, and/or 13), an image sensor I (e.g., the image sensor I of FIGS. 8, 11, and/or 13), and/or at least one optical member R1 (e.g., the first optical member R1 of FIGS. 8, 11, and/or 13). In an embodiment, the lens layout LA may be aligned with any one of openings 387 (e.g., the transparent area 387 of FIG. 5) provided on the rear surface of the electronic device 900. The at least one optical member R1 may reflect or refract light incident through the lens layout LA to guide the light to the image sensor I. For example, the at least one optical member R1 may refer to implementing a portion of the path between the lens layout LA and the image sensor I among paths through which externally incident light reaches the image sensor I via the lens layout LA. In the illustrated embodiment, the image capturing device 1000 is illustrated as including one optical member R1, but it should be noted that the embodiment(s) of the disclosure are not limited thereto. For example, an optical member R1 designed to implement an optical path by combining two different prisms or mirror-shaped optical members may be fabricated.

According to an embodiment, the lens layout LA may focus or guide light (e.g., the incident light IL of FIG. 7) incident from the outside along the Z-axis direction (e.g., the first direction D1 of FIG. 6), and the at least one optical member R1 may reflect or refract the light incident through the lens layout LA at least once to guide the light in a direction (e.g., the second direction D2 of FIG. 6) crossing the Z-axis. In the illustrated embodiment, the at least one optical member R1 may reflect or refract light incident through the lens layout LA twice to guide the light to the image sensor I. In the state illustrated in FIG. 15 or FIG. 16, light (e.g., light indicated by "RL1") initially reflected or refracted by the at least one optical member R1 may travel substantially inside the at least one optical member R1 along the X-axis direction. In an embodiment, it may be understood that the light RL1 initially reflected or refracted by the at least one optical member R1 in the state illustrated in FIG. 17 travels along a direction inclined by a specified angle with respect to the X-axis. For example, when referring to the embodiments of FIGS. 15 to 17, the description based on the Cartesian coordinate system is for convenience of description, and the description does not limit the embodiment(s) of the disclosure. Those of ordinary skill in the art will readily understand that the traveling direction of the reflected light or the refracted light may be implemented differently from the direction mentioned in the detailed description, depending on the manufacturing specifications or arrangement of the at least one optical member R1.

According to an embodiment, the image sensor I may include an imaging surface img that is substantially rectangular in shape. For example, the imaging surface img may have a rectangular shape with a length ratio of the longer side LS to the shorter side SS, approximately 3:2, approximately 4:3, approximately 16:9, and/or approximately 21:9, but it should be noted that the present disclosure is not limited to these ratios. The image sensor I may be aligned in substantially the same direction as a display (e.g., the display 330 of FIG. 4) in the electronic device 900. For example, when the longer side of the display 330 is disposed parallel to the Y-axis, the longer side of the imaging surface img may be disposed substantially parallel to the Y-axis. In an embodiment, when the image sensor I and the display 330 are aligned in substantially the same direction, the user may intuitively recognize an image to be captured while viewing a live image in image-capturing a subject.

According to an embodiment, the image sensor I (e.g., the imaging surface img) may be disposed substantially parallel to the display 330. For example, the image sensor I and the display 330 may be disposed substantially parallel to the XY plane in the illustrated Cartesian coordinate system. In an embodiment, the image sensor I may be disposed to be inclined within a specified angle range with respect to the display 330. Here, the 'specified angle range' may be determined by an arrangement environment of the image capturing device 1000 in the electronic device 900, or by manufacturing specifications of the at least one optical member R1. Regardless of whether the image sensor I is parallel or inclined with respect to the display 330, the longer side LA of the imaging surface img may be aligned substantially parallel to the longer side of the display 330.

In the state illustrated in FIG. 15 or 16, it may be understood that the path along which the light RL1 initially reflected or refracted by the at least one optical member R1 travels inside the at least one optical member R1, is substantially parallel to the X-axis while crossing the longer side LS of the imaging surface Img. For example, the at least one optical member R1 may be designed, manufactured, or disposed in a manner where at least a portion of the traveling path of the reflected or refracted light is aligned along a direction (e.g., the X-axis direction) substantially crossing the Y-axis. In an embodiment, when the length direction (e.g., longer side) of the image sensor I and/or the display 330 is substantially parallel to the Y-axis, the length direction of at least one optical member R1 may be substantially parallel to the X-axis. Such design or arrangement structure of the at least one optical member R1 may increase the capacity of a battery (e.g., the battery 350 of FIG. 4) within the electronic device 900 or may enhance the degree of design freedom in the arrangement of other electronic components. In an embodiment, when the length direction of the electronic device 900 (e.g., the display 330) and the length direction of the image sensor I are substantially parallel to the Y-axis, it may be understood that the length direction of the at least one optical member R1 is parallel to the X-axis. For example, the length direction of the at least one optical member R1 may be substantially perpendicular to the length direction of either the display 330 or the image sensor I.

Figure 18:
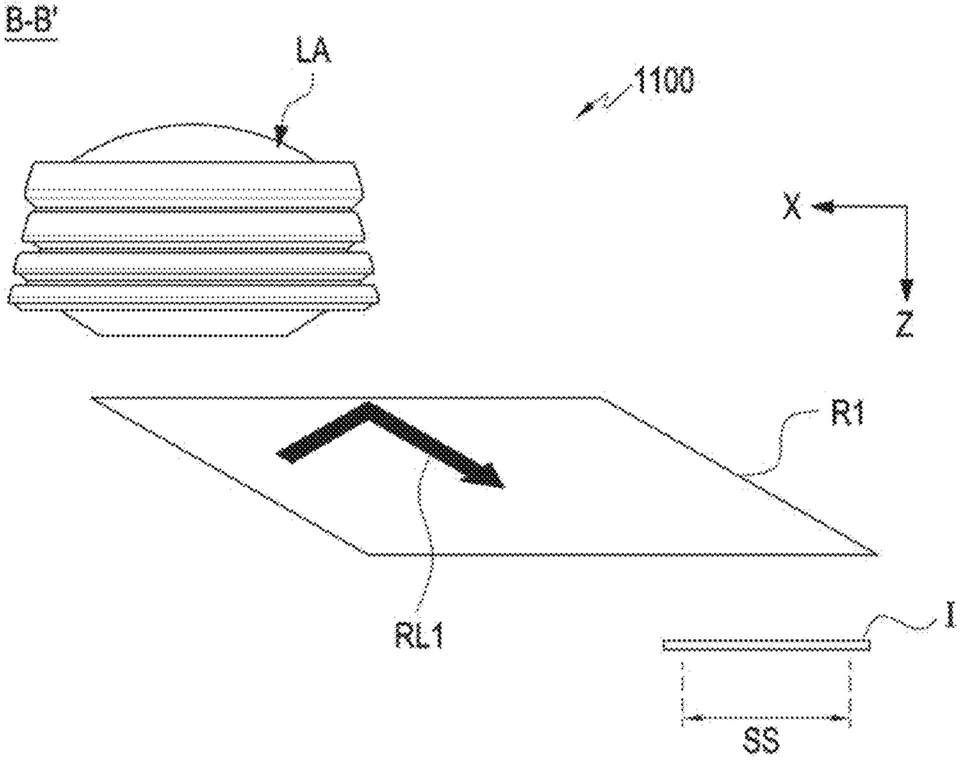
FIG. 18 is a view illustrating the image capturing device of FIG. 15, taken along line B-B' according to an embodiment.

FIG. 18 is a view illustrating an image capturing device 1100 of FIG. 15 (e.g., the camera modules 180, 205, 212 or 213 of FIGS. 1 to 3, or the image capturing device 500 of FIG. 6), taken along line B-B' according to an embodiment of the disclosure.

In the image capturing device 1000 of FIG. 17, when the image sensor I is defined to be disposed in the −Z direction with respect to the optical member R1, it may be understood that the image sensor I in the image capturing device 1100 of FIG. 18 is disposed in the +Z direction with respect to the optical member R1. In an embodiment, depending on the design of the optical member R1, for example, based on the angle between two adjacent surfaces of the optical member R1 illustrated as 'Ang-min' of FIG. 9, light may be reflected or refracted at least twice within the optical member R1. This configuration may be easily understood through the above-described embodiment(s). In an embodiment, the light reflected or refracted within the optical member R1 may include a traveling component in the X-axis direction and a traveling component in the Z-axis direction. Depending on the design of the optical member R1, the light reflected or refracted within the optical member R1 may further include a traveling component in the Y-axis direction. In the image capturing device 1100 of FIG. 18, the arrangement of the image sensor I with respect to the display 330 and/or the configuration in which light reflected or refracted within the optical member R1 crosses an area corresponding to the longer side LS of the imaging surface (img) may be similar to that of the image capturing device 1000 of FIG. 17, and thus a detailed description thereof will be omitted.

Figure 19:
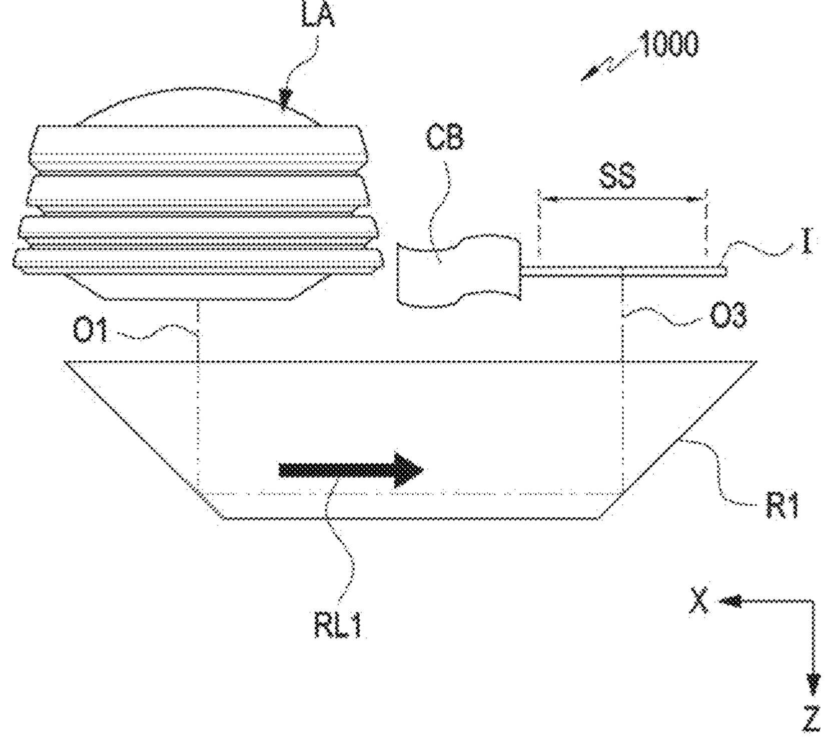
FIG. 19 is a view illustrating wiring of an image capturing device in the electronic device of FIG. 15 according to an embodiment.
Figure 20:
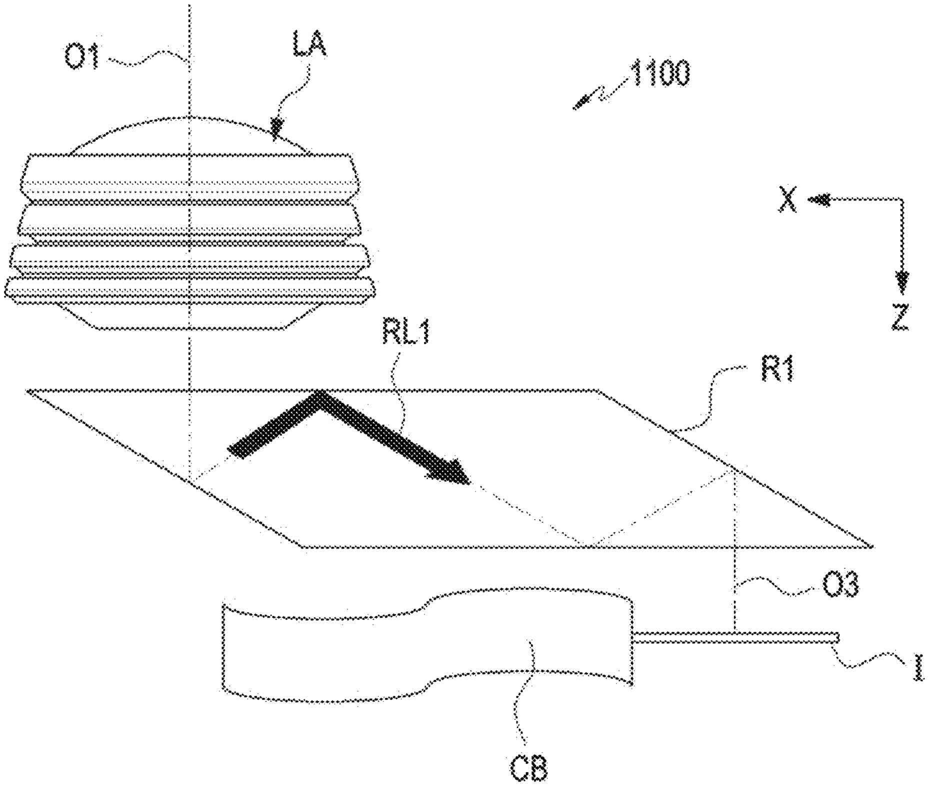
FIG. 20 is a view illustrating wiring of an image capturing device in the electronic device of FIG. 15 according to an embodiment.

FIG. 19 is a view illustrating wiring of the image capturing device 1000 in the electronic device 900 of FIG. 15, according to an embodiment of the disclosure. FIG. 20 is a view illustrating wiring of the image capturing device 1100 in the electronic device 900 of FIG. 15 according to an embodiment of the disclosure.

Referring further to FIGS. 19 and 20, the electronic device 900 and/or the image capturing devices 1000 and 1100 may include a connection board CB extending from one side of the image sensor I. The connection board CB may include, for example, a flexible printed circuit board that electrically connects the image sensor I to a main circuit board (e.g., the printed circuit board 360 of FIG. 4). In an embodiment, the connection board CB may be disposed in an area or space substantially adjacent to the optical member R1. For example, it may be understood that the connection board CB is disposed in an area between the optical axis (e.g., the first optical axis O1) of the lens layout LA and the optical axis (e.g., the third optical axis O3) of the image sensor I. Accordingly, the connection board CB enables the electrical connection of the image sensor I to the main circuit board without substantially occupying an additional space inside the electronic device 900.

According to an embodiment, the light RL1 refracted or reflected at least twice by the optical member R1 may travel along a direction crossing the first optical axis O1 and may be incident on the image sensor I along the direction of the third optical axis O3. For example, the light RL1 refracted or reflected by the optical member R1 may travel inside the optical member R1 across a portion corresponding to an area in which the connection board CB is disposed. In an embodiment, in the state illustrated in FIG. 15 or FIG. 16, it may be understood that the connection board CB extends or is disposed along a direction in which the light RL1 refracted or reflected by the optical member R1 travels, for example, substantially along the X-axis direction. In an embodiment, by being disposed adjacent to the optical member R1 and/or by being arranged along the traveling direction of the light RL1 refracted or reflected by the optical member R1, the space occupied inside the electronic device 900 in the arrangement of the connection board CB may be reduced. In an embodiment, although not illustrated, a portion of the connection board CB may be arranged around the space where the lens layout LA and/or the optical members R1 and R2 are located.

Figure 21:
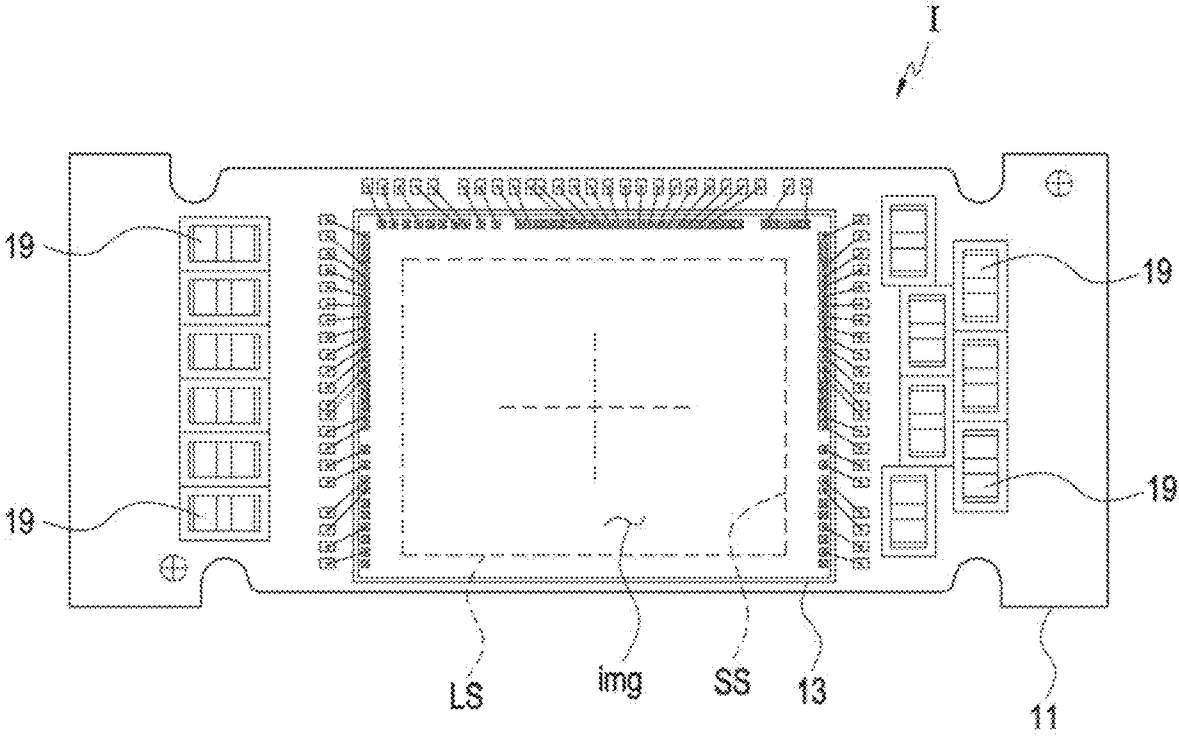
FIG. 21 is a plan view illustrating an image sensor of the image capturing device of FIG. 16 according to an embodiment.
Figure 22:
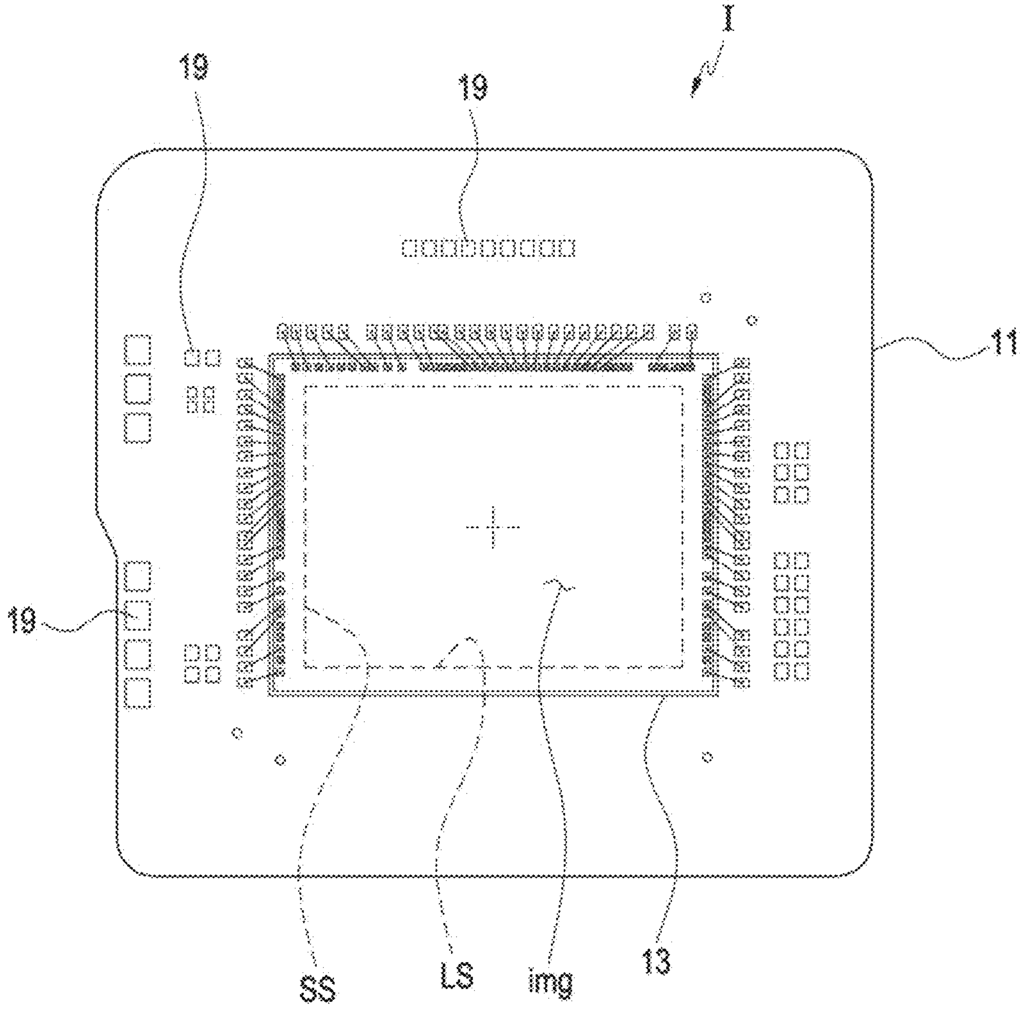
FIG. 22 is a plan view illustrating an image sensor of the image capturing device of FIG. 16 according to an embodiment.

FIG. 21 is a plan view illustrating an image sensor I of the image capturing device 1000 of FIG. 16, according to an embodiment of the disclosure. FIG. 22 is a plan view illustrating an image sensor I of the image capturing device 1000 of FIG. 16, according to an embodiment of the disclosure.

Referring further to FIG. 21 and/or FIG. 22, the image sensor I may include a substrate 11 and a sensor pad 13 where the imaging surface img is provided, and the sensor pad 13 (e.g., the imaging surface img) may be electrically connected to the substrate 11 by wire bonding. The imaging surface img is, for example, an 'active area' of the image sensor I, and may include an array of light receiving elements (e.g., pixels) that receive light and generate electrical signals. In an embodiment, the image sensor I may include electric components 19 disposed on the substrate 11 around the sensor pad 13. The electric components 19 are for implementing an operation of transmitting, processing, and/or storing power transmitted to the sensor pad 13 and/or signals generated by the sensor pad 13, and may include, for example, a capacitor, an inductor, and/or a register.

According to an embodiment, the electric components 19 may be disposed in areas adjacent to the two shorter sides SS of the imaging surface img and/or in an area adjacent to one of the longer sides LS of the imaging surface img. For example, in the image sensor I, there may be a greater number of electric components 19 disposed in the area(s) adjacent to the shorter side SS of the imaging surface img, as compared to the electric components 19 disposed in the areas adjacent to the longer side LS of the imaging surface img. In an embodiment, as illustrated in FIG. 21, in the areas adjacent to the longer side LS of the imaging surface img, a structure(s) for wire bonding may be disposed without the other electric components 19 disposed on the substrate 11, and the electric components 19 may be distributed and disposed in two areas adjacent to the shorter side SS. In an embodiment, as illustrated in FIG. 22, the electric components 19 may be distributed and disposed within two areas substantially adjacent to the two shorter sides SS of the imaging surface img and in one area adjacent to one of the longer sides LS of the imaging surface img. With this arrangement of the electric components 19, at least one of the areas adjacent to the two longer sides LS of the imaging surface img is substantially free from the arrangement of electric components 19, thereby reducing the internal space occupied by the image sensor I and/or the image capturing device 1000 within the electronic device 900.

An image capturing device according to an embodiment of the disclosure (e.g., the camera module 180, 205, 212, or 213 in FIGS. 1 to 3, or the image capturing device 500, 600, 700, or 800 in FIGS. 6, 8, 11, and/or 13) may include at least one optical member (e.g., the first optical member R1 of FIGS. 8, 11 and/or 13) disposed between the lens(es) and the image sensor (e.g., the image sensor S of FIGS. 8, 11 and/or 13), which may make it possible to freely design a light traveling path leading to the image sensor S. For example, the arrangement direction of the imaging surface (e.g., the imaging surface img of FIG. 8) of the image sensor S may be variously designed with respect to the arrangement of lenses (e.g., lenses L1, L2, L3, L4 and L5 of FIG. 8). Accordingly, it is easy to mount an image capturing device having high optical performance in a miniaturized and lightened electronic device such as a smartphone (e.g., the electronic device 101, 102, 104, 200, 300, or 400 in FIGS. 1 to 6). In an embodiment, by disposing an additional optical member (e.g., the first refractive member 413 in FIG. 6) in front of the arrangement of lenses, it is possible to arrange lenses in the length direction (e.g., the Y-axis direction in FIG. 5) and/or the width direction (e.g., the X-axis direction of FIG. 5) of the electronic device. For example, a degree of design freedom in the number and arrangement of lenses may be increased in a miniaturized electronic device. In an embodiment, when lenses are arranged in the length direction or the width direction of the electronic device, it may be easy to secure a space for moving the lenses forward and backward in the optical axis direction (e.g., the first optical axis O1 in FIG. 8). For example, it may be easy to improve optical performance (e.g., telephoto performance) of the image capturing device by securing an environment capable of implementing a focal length adjustment operation and/or a focus adjustment operation. In an embodiment, a size of the light emission surface of the first optical member (e.g., the area through which light incident to the image sensor passes) may be controlled with respect to the imaging surface img, thereby suppressing stray light from being generated and enabling implementation of good optical performance in the image capturing device.

Effects that are capable of being obtained by the disclosure are not limited to those described above, and other effects not described above may be clearly understood by a person ordinarily skilled in the art to which the disclosure belongs based on the following description.

As described above, according to an embodiment of the disclosure, an image capturing device (e.g., the camera module 180, 205, 212, or 213 in FIGS. 1 to 3, or the image capturing device 500, 600, 700, or 800 in FIGS. 6, 8, 11, and/or 13) may include at least two lenses (L1, L2, L3, L4, and L5 of FIG. 8) aligned along a direction of a first optical axis (O1) (e.g., the first optical axis O1 of FIG. 8); an image sensor (e.g., the image sensor S of FIG. 8) configured to receive light guided or condensed through the at least two lenses; and at least one optical member (e.g., the first optical member R1 of FIG. 8) disposed between the at least two lenses and the image sensor to receive light incident through the at least two lenses, and refract or reflect the light at least twice, and then guide or emit the light to the image sensor. In an embodiment, the image capturing device may satisfy [Conditional Equation 1] and [Conditional Equation 2] below.

$$1.2 =< w/img-X =< 2.5 \quad \text{[Conditional Equation 1]}$$

$$15 =< Ang-\min =< 50 \quad \text{[Conditional Equation 2]}$$

Herein, 'img-X' represents a length (e.g., see FIG. 10) of a longer side of horizontal/vertical lengths of an imaging surface (img) of the image sensor; 'w' represents a length of a longer side of horizontal/vertical lengths of emission surface (e.g., the emission surface F2 in FIG. 9 or the area indicated 'F2E' in FIG. 10) facing the image sensor among surfaces of an optical member (hereinafter, 'a first optical member') closest to the image sensor among the at least one optical member; and 'Ang-min' represents the smallest angle (e.g., the second angle indicated by 'Ang-p2' in FIG. 9) among angles formed by two adjacent surfaces of the first optical member.

According to an embodiment, the first optical member may satisfy [Conditional Equation 3] below for an Abbe number Vd-1:

$$25 =< Vd-1 =< 95 \quad \text{[Conditional Equation 3]}$$

According to an embodiment, the first optical member comprises an anti-reflection coating layer formed on at least one of an incident surface (e.g., the incident surface F1 in FIG. 9) facing the at least two lenses, and the emission surface (e.g., the emission surface F2 in FIG. 9 or the area indicated by 'F2E' in FIG. 10).

According to an embodiment, the first optical member may include an infrared blocking coating layer formed on at least one of the incident surface facing the at least two lenses, and the emission surface.

According to an embodiment, the image capturing device may satisfy [Conditional Equation 4] below for a Field of View (FOV).

$$5 =< FOV =< 35 \quad \text{[Conditional Equation 4]}$$

According to an embodiment, the image capturing device as described above may be configured to move at least one of the at least two lenses along the first optical axis direction, to thereby perform a focusing function.

According to an embodiment, the image capturing device as described above may be configured to move at least one of the at least two lenses along a direction perpendicular to the first optical axis, to thereby perform an image stabilizing function.

According to an embodiment, the image capturing device as described above may be configured to move or rotate the at least one optical member, to thereby perform an image stabilizing function or a subject tracking function.

According to an embodiment, the image capturing device as described above may further include a second optical member (e.g., the second optical member R2 in FIG. 8) aligned with the at least one optical member in the first optical axis direction with the at least two lenses interposed therebetween. In an embodiment, the second optical member may be configured to receive light incident from a direction (e.g., ID2 direction of FIG. 8) different from that of a first optical axis, and refract or reflect the light in the direction of the first optical axis, to thereby guide the light to the at least two lenses.

According to an embodiment, the first optical member may further include an incident surface facing the at least two lenses. In an embodiment, the first optical member may be configured to reflect or refract the light incident on the incident surface at least twice between the incident surface and the emission surface.

According to an embodiment, the first optical member may further include a reflective surface (e.g., the reflective surface F3 in FIG. 9) disposed to be inclined with respect to the emission surface. In an embodiment, the emission surface and the reflective surface may reflect or refract the light incident on the incident surface, inside the first optical member. In an embodiment, the light reflected or refracted at least twice inside the first optical member is guided or emitted to the image sensor through the emission surface.

According to an embodiment, the image capturing device as described above is configured such that at least one of an angle formed between the incident surface and the reflective surface or an angle formed between the reflective surface and the emission surface may satisfy [Conditional Equation 2].

According to an embodiment, the first optical member may include a prism.

According to an embodiment of the disclosure, an electronic device (e.g., the electronic device 101, 102, 104, 200, 300, or 400 in FIGS. 1 to 6) may include an image capturing device (e.g., the camera module 180, 205, 212, or 213 in FIGS. 1 to 3, or the image capturing device 500, 600, 700, or 800 in FIGS. 6, 8, 11, and/or 13)); and a processor (e.g., the processor 120 in FIG. 1) configured to acquire an image by receiving external light using the image capturing device. In an embodiment, the image capturing device may include at least two lenses (e.g., the lenses L1, L2, L3, L4, and L5 in FIG. 8) aligned along a first optical axis direction; an image sensor (e.g., the image sensor S in FIG. 8) configured to receive light guided or condensed through the at least two lenses; and at least one optical member (e.g. the first optical member R1 of FIG. 8) disposed between the at least two lenses and the image sensor to receive light incident through the at least two lenses, and refract or reflect the light at least twice, and then guide or emit the light to the image sensor. In an embodiment, the image capturing device may satisfy [Conditional Equation 5] and [Conditional Equation 6] below.

$$1.2 =< w/img-X =< 2.5 \quad \text{[Conditional Equation 5]}$$

$$15 =< Ang-\min =< 50 \quad \text{[Conditional Equation 6]}$$

Herein, 'img-X' represents a length (e.g., see FIG. 10) of a longer side of horizontal/vertical lengths of an imaging surface (img) of the image sensor; 'w' represents a length of a longer side of horizontal/vertical lengths of an emission surface (e.g., the emission surface F2 in FIG. 9 or the emission surface F2E in FIG. 10) facing the image sensor among surfaces of an optical member (hereinafter, 'a first optical member') closest to the image sensor among the at least one optical member; and 'Ang-min' represents the smallest angle (e.g., the second angle indicated by 'Ang-p2' of FIG. 9) among angles formed by two adjacent surfaces of the first optical member.

According to an embodiment, the processor may be configured to move at least one of the at least two lenses along the first optical axis direction, to thereby perform a focusing function.

According to an embodiment, the processor may be configured to move at least one of the at least two lenses along a direction perpendicular to the first optical axis, to thereby perform an image stabilizing function.

According to an embodiment, the processor may be configured to move or rotate the at least one optical member, to thereby perform an image stabilizing function or a subject tracking function.

According to an embodiment, the first optical member may satisfy [Conditional Equation 7] below for an Abbe number Vd-1.

$$25 =< Vd-1 =< 95 \quad \text{[Conditional Equation 7]}$$

According to an embodiment, the image capturing device may satisfy [Conditional Equation 8] below for a Field of View (FOV).

$$5 =< FOV =< 35 \quad \text{[Conditional Equation 8]}$$

According to an embodiment, the first optical member may include an infrared blocking coating layer formed on at least one of the incident surface (e.g., the incident surface F1 in FIG. 9) facing the at least two lenses, and the emission surface. According to an embodiment of the disclosure, an image capturing device may comprise at least two lenses aligned along an optical axis; an optical member disposed such that light passing through the at least two lenses is incident via a first surface of the optical member reflected at least twice within the optical member, and emitted out of the optical member via a second surface thereof; and an image sensor configured to detect the light emitted from the second surface of the optical member through an imaging surface of the image sensor. In an embodiment, the optical member and the image sensor are disposed such that the second surface is substantially parallel with the imaging surface, and that a first side of the second surface is substantially parallel with a second side of the imaging surface. In an embodiment, the second side may be longer than adjacent other sides of the imaging surface, and a first length of the first side may be longer than a second length of the second side.

According to an embodiment, the optical member may be configured to satisfy 1.2=<w/img-X=<2.5 and 15=<Ang-min=<50, where 'w' is the first length, 'img-X' is the second length, 'w/img-X' is a ratio of the first length to the second length, and 'Ang-min' is an smallest angle among angles formed by two adjacent surfaces of the optical member.

According to an embodiment, the optical member may be configured to have an Abbe number Vd-1 that satisfies [Conditional equation 3], 25=<Vd-1=<95.

According to an embodiment, the optical member may include an anti-reflection coating layer formed on at least one of the first surface or the second surface.

According to an embodiment, the optical member may include an infrared blocking coating layer formed on at least one of the first surface or the second surface.

According to an embodiment, the at least two lenses are configured to have a Field of View (FOV) that satisfies [Conditional equation 4], 5=<FOV=<35.

According to an embodiment, the image capturing device may further comprise second optical member aligned with the optical member along the optical axis with the at least two lenses interposed therebetween. In an embodiment, the second optical member may be configured to receive light incident from a direction different from that of the optical axis, and reflects the light in the direction of the optical axis, to guide the light to the at least two lenses.

According to an embodiment, the optical member may have a shape of a parallelogram.

According to an embodiment, the optical member may include a first reflective surface inclined with respect to the first surface, and a second reflective surface inclined with respect to the second surface and substantially parallel with the first reflective surface.

According to an embodiment, at least one of a first angle between the first surface and the first reflective surface or a second angle between the second reflective surface and the second surface satisfies 15=<Ang-min=<50, where 'Ang-min' is any one of the first angle and the second angle.

According to an embodiment, the optical member may be formed as a prism.

According to an embodiment, the optical member may be composed of a glass.

According to an embodiment, when viewed in a direction facing the at least two lenses, the optical member may be located under the at least two lenses and above the image sensor.

According to an embodiment, when viewed in a direction facing the at least two lenses, the optical member may be located under the at least two lenses and the image sensor.

According to an embodiment, the imaging surface may include longer sides and short sides shorter than the longer sides. In an embodiment, the image sensor may include a first number of electric components disposed in a first area adjacent to the longer sides, and a second number of electric components disposed in second areas adjacent to the short sides. In an embodiment, the second number may be larger than the first number.

According to an embodiment, an electronic device may comprise an image capturing device as described above, and a processor configured to receive outside light using the image capturing device in order to acquire an image.

According to an embodiment, the optical member may be disposed such that a length direction of the optical member is substantially perpendicular to a length direction of the electronic device or substantially perpendicular to a length direction of the image sensor.

According to an embodiment, the processor may be further configured to execute the instructions to move at least one of the at least two lenses along the optical axis for an auto focusing, or execute the instructions to move the image sensor along the optical axis for an auto focusing.

According to an embodiment, the processor may be further configured to execute the instructions to move at least one of the at least two lenses along a direction perpendicular to the optical axis for an optical image stabilizing function, or execute the instructions to move the image sensor along a direction perpendicular to the optical axis for an optical image stabilizing function.

According to an embodiment, the processor may be further configured to execute the instructions to move or rotate the optical member for an image stabilizing function or a subject tracking function.

It will be apparent to one of ordinary skill in the art that the contact structure of the camera module and the electronic device comprising the same according to the disclosure as described above are not limited to the above-described embodiments and those shown in the drawings, and various changes, modifications, or alterations may be made thereto without departing from the scope of the present disclosure.

What is claimed is:

1. An image capturing device comprising:

a plurality of lenses aligned along an optical axis;

an image sensor including an imaging surface, the image sensor configured to detect a light passing through the plurality of lenses, the imaging surface including a first side and a second side substantially perpendicular to each other, and the second side being longer than the first side; and an optical member disposed such that the light passing through the plurality of lenses is incident via a portion of a first surface of the optical member, the light is reflected at least twice within the optical member, and the light is emitted out of the optical member via a portion of a second surface facing the imaging surface of the image sensor, the portion of the second surface including a third side adjacent to and parallel with the second side of the imaging surface;

wherein a first length of the third side of the portion of the second surface is longer than a second length of the second side of the imaging surface, wherein the optical member and the imaging surface are configured to satisfy $1.2 \leq w/img\text{-}X \leq 2.5$ where 'w' is the first length, 'img-X' is the second length, 'w/img-X' is a ratio of the first length to the second length, and wherein the first surface and the second surface of the optical member are parallel with respect to the imaging surface of the image sensor.

2. The image capturing device of claim 1, wherein the optical member is disposed such that a length direction of the optical member is substantially perpendicular to the second side of the imaging surface.

3. The image capturing device of claim 1, wherein the optical member is configured to have an Abbe number Vd-1 that satisfies 25=<Vd-1=<95.

4. The image capturing device of claim 1, wherein the optical member includes an anti-reflection coating layer formed on at least one of the first surface or the second surface.

5. The image capturing device of claim 1, wherein the optical member includes an infrared blocking coating layer formed on at least one of the first surface or the second surface.

6. The image capturing device of claim 1, wherein the plurality of lenses are configured to have a Field of View (FOV) that satisfies 5 degrees=<FOV=<35 degrees.

7. The image capturing device of claim 1, wherein the optical member has a shape of a parallelogram.

8. The image capturing device of claim 7, wherein the optical member includes a first reflective surface inclined with respect to the first surface, and a second reflective surface inclined with respect to the second surface and substantially parallel with the first reflective surface.

9. The image capturing device of claim 1, wherein the optical member includes a first reflective surface inclined with respect to the first surface, and a second reflective surface inclined with respect to the second surface and substantially parallel with the first reflective surface, and wherein at least one of a first angle between the first surface and the first reflective surface or a second angle between the second reflective surface and the second surface satisfies 15 degrees=<Ang-min=<50 degrees, where 'Ang-min' is any one of the first angle and the second angle.

10. An electronic device comprising:

a housing;

a display disposed on a front surface of the housing;

at least two cameras disposed on a rear surface of the housing opposite to the front surface;

wherein one of the at least two cameras comprises:

a plurality of lenses aligned along an optical axis;

an image sensor including an imaging surface, the image sensor configured to detect a light passing through the plurality of lenses, the imaging surface including a first side and a second side substantially perpendicular to each other, and the second side being longer than the first side; and an optical member disposed such that the light passing through the plurality of lenses is incident via a portion of a first surface of the optical member, the light is reflected at least twice within the optical member, and the light is emitted out of the optical member via a portion of a second surface facing the imaging surface of the image sensor, the portion of the second surface including a third side adjacent to and parallel with the second side of the imaging surface;

wherein a first length of the third side of the portion of the second surface is longer than a second length of the second side of the imaging surface, wherein the optical member and the imaging surface are configured to satisfy 1.2≤w/img-X≤2.5 where 'w' is the first length, 'img-X' is the second length, 'w/img-X' is a ratio of the first length to the second length, and wherein the first surface and the second surface of the optical member are parallel with respect to the imaging surface of the image sensor.

11. The electronic device of claim 10, wherein the optical member is disposed such that a length direction of the optical member is substantially perpendicular to the second side of the imaging surface or substantially perpendicular to a length direction of the electronic device.

12. The electronic device of claim 10, wherein the image sensor is arranged such that a length direction of the image sensor is substantially parallel with a length direction of the display, and the optical member is arranged such that the length direction of the optical member is substantially perpendicular to the length direction of the display.

13. The electronic device of claim 10, wherein the optical member is configured to have an Abbe number Vd-1 that satisfies 25=<Vd-1=<95.

14. The electronic device of claim 10, wherein the plurality of lenses are configured to have a Field of View (FOV) that satisfies 5 degrees=<FOV=<35 degrees.

15. The electronic device of claim 10, wherein the optical member has a shape of a parallelogram.

16. The electronic device of claim 10, wherein the optical member includes a first reflective surface inclined with respect to the first surface, and a second reflective surface inclined with respect to the second surface and substantially parallel with the first reflective surface, and wherein at least one of a first angle between the first surface and the first reflective surface or a second angle between the second reflective surface and the second surface satisfies 15 degrees=<Ang-min=<50 degrees, where 'Ang-min' is any one of the first angle and the second angle.

17. The electronic device of claim 10, further comprising:

memory storing instructions; and at least one processor configured to executed the instructions to cause the electronic device to acquire an image using the at least two cameras;

wherein the at least one processor is further configured to executed the instructions to cause the one of the at least two cameras:

to move at least one of the plurality of lenses along the optical axis for an auto focusing, or to move the image sensor along the optical axis for the auto focusing.

18. The electronic device of claim 17, wherein the at least one processor is further configured to executed the instructions to cause the one of the at least two cameras:

to move at least one of the plurality of lenses along a direction perpendicular to the optical axis for an optical image stabilizing function, or to move the image sensor along the direction perpendicular to the optical axis for the optical image stabilizing function.

19. The electronic device of claim 17, wherein the at least one processor is further configured to executed the instructions to cause the one of the at least two cameras to move or rotate the optical member for an image stabilizing function or a subject tracking function.

* * * * *